(12) United States Patent
Bakshi et al.

(10) Patent No.: US 9,438,633 B1
(45) Date of Patent: Sep. 6, 2016

(54) SYSTEM, METHOD AND COMPUTER PROGRAM PRODUCT FOR PROVIDING UNIFIED AUTHENTICATION SERVICES FOR ONLINE APPLICATIONS

(71) Applicant: CITIBANK, N.A., New York, NY (US)

(72) Inventors: Bikram S. Bakshi, Olney, MD (US); David W. Helms, Alexandria, VA (US); Anthony C. Rochon, Ashburn, VA (US); Trevor J. Walker, Montgomery Village, MD (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 14/684,083

(22) Filed: Apr. 10, 2015

Related U.S. Application Data

(63) Continuation of application No. 12/232,167, filed on Sep. 11, 2008, now Pat. No. 9,009,798, which is a continuation of application No. 09/814,971, filed on Mar. 23, 2001, now Pat. No. 7,441,263.

(60) Provisional application No. 60/191,471, filed on Mar. 23, 2000.

(51) Int. Cl.
*G06F 17/00* (2006.01)
*H04L 29/06* (2006.01)

(52) U.S. Cl.
CPC .............. *H04L 63/20* (2013.01); *H04L 63/08* (2013.01); *H04L 63/10* (2013.01)

(58) Field of Classification Search
CPC .............. H04L 63/20; H04L 63/0815; H04L 63/0861; H04L 2463/082; G06F 21/31
USPC ........................................................ 726/1
See application file for complete search history.

(56) References Cited

U.S. PATENT DOCUMENTS 3,639,905 A 2/1972 Yaida et al.
4,449,189 A 5/1984 Feix et al.
(Continued)

FOREIGN PATENT DOCUMENTS

WO 9704394 2/1997
WO 9804996 2/1998
(Continued)

OTHER PUBLICATIONS

Shibata et al, Analysis of the End-To-End Performance of Multimedia Information Services on a Local Area Network, 1988, IEEE, pp. 344-354.*

(Continued)

*Primary Examiner* — Luu Pham
*Assistant Examiner* — Jenise Jackson
(74) *Attorney, Agent, or Firm* — Eric L. Sophir; Dentons US LLP

(57) ABSTRACT

A system and method remotely enrolls, authenticates and provides unified authentication services in an ASP setting to a user to access requested information via a communication medium. A filter is coupled to client side components via the communication medium and a user management component coupled to the client side components via the communication medium. The user management component allows end-users to register their credentials only once. In addition, the user management component allows end-users to define the level of protection of access to their web application accounts. This includes accounts that have been configured specifically for use with the present invention and particular user credentials and accounts that have been subsequently set up but configured to use the same user credentials. The present invention can then reuse those credentials to authenticate the user to one or more potentially unrelated web applications.

20 Claims, 16 Drawing Sheets

(56) References Cited

U.S. PATENT DOCUMENTS

| | | |
|---|---|---|
| 4,685,055 A | 8/1987 | Thomas |
| 4,975,969 A | 12/1990 | Tal |
| 4,993,068 A | 2/1991 | Piosenka et al. |
| 5,018,096 A | 5/1991 | Aoyama |
| 5,055,658 A | 10/1991 | Cockburn |
| 5,056,147 A | 10/1991 | Turner et al. |
| 5,065,429 A | 11/1991 | Lang |
| 5,111,512 A | 5/1992 | Fan et al. |
| 5,131,038 A | 7/1992 | Puhl et al. |
| 5,163,094 A | 11/1992 | Prokoski et al. |
| 5,165,032 A | 11/1992 | Herbault |
| 5,181,786 A | 1/1993 | Hujink |
| 5,191,611 A | 3/1993 | Lang |
| 5,195,133 A | 3/1993 | Kapp et al. |
| 5,228,094 A | 7/1993 | Villa |
| 5,229,764 A | 7/1993 | Matchett et al. |
| 5,245,329 A | 9/1993 | Gokcebay |
| 5,259,025 A | 11/1993 | Monroe et al. |
| 5,268,963 A | 12/1993 | Monroe et al. |
| 5,280,527 A | 1/1994 | Gullman et al. |
| 5,291,560 A | 3/1994 | Daugman |
| 5,321,765 A | 6/1994 | Costello |
| 5,337,043 A | 8/1994 | Gokcebay |
| 5,339,361 A | 8/1994 | Schwalm et al. |
| 5,386,104 A | 1/1995 | Sime |
| 5,412,727 A | 5/1995 | Drexler et al. |
| 5,412,738 A | 5/1995 | Brunelli et al. |
| 5,414,755 A | 5/1995 | Bahler et al. |
| 5,432,864 A | 7/1995 | Lu et al. |
| 5,436,970 A | 7/1995 | Ray et al. |
| 5,442,645 A | 8/1995 | Ugon et al. |
| 5,450,524 A | 9/1995 | Rissanen |
| 5,455,407 A | 10/1995 | Rosen |
| 5,456,256 A | 10/1995 | Schneider et al. |
| 5,457,747 A | 10/1995 | Drexler et al. |
| 5,465,290 A | 11/1995 | Hampton et al. |
| 5,469,506 A | 11/1995 | Berson et al. |
| 5,473,144 A | 12/1995 | Mathurin, Jr. |
| 5,475,758 A | 12/1995 | Kikuchi et al. |
| 5,481,720 A | 1/1996 | Loucks et al. |
| 5,502,759 A | 3/1996 | Cheng et al. |
| 5,509,083 A | 4/1996 | Abtahi et al. |
| 5,513,250 A | 4/1996 | McAllister |
| 5,513,272 A | 4/1996 | Bogosian, Jr. |
| 5,534,855 A * | 7/1996 | Shockley ............... G06F 21/31 340/5.52 |
| 5,566,327 A | 10/1996 | Sehr |
| 5,577,120 A | 11/1996 | Penzias |
| 5,578,808 A | 11/1996 | Taylor |
| 5,581,630 A | 12/1996 | Bonneau, Jr. |
| 5,586,171 A | 12/1996 | McAllister et al. |
| 5,594,806 A | 1/1997 | Colbert |
| 5,608,387 A | 3/1997 | Davies |
| 5,613,012 A | 3/1997 | Hoffman et al. |
| 5,615,277 A | 3/1997 | Hoffman |
| 5,623,552 A | 4/1997 | Lane |
| 5,635,012 A | 6/1997 | Belluci et al. |
| 5,636,282 A | 6/1997 | Holmquist et al. |
| 5,636,292 A | 6/1997 | Rhoads |
| 5,642,160 A | 6/1997 | Bennett |
| 5,646,839 A | 7/1997 | Katz |
| 5,647,017 A | 7/1997 | Smithies et al. |
| 5,655,013 A | 8/1997 | Gainsboro |
| 5,657,389 A | 8/1997 | Houvener |
| 5,659,616 A | 8/1997 | Sudia |
| 5,664,170 A | 9/1997 | Taylor |
| 5,668,874 A | 9/1997 | Kristol et al. |
| 5,677,851 A | 10/1997 | Kingdon et al. |
| 5,686,765 A | 11/1997 | Washington |
| 5,699,514 A | 12/1997 | Durinovic-Johri et al. |
| 5,712,912 A | 1/1998 | Tomko et al. |
| 5,712,914 A | 1/1998 | Aucsmith et al. |
| 5,719,941 A | 2/1998 | Swift et al. |
| 5,719,950 A | 2/1998 | Osten et al. |
| 5,724,423 A | 3/1998 | Khello |
| 5,751,260 A | 5/1998 | Nappi et al. |
| 5,761,329 A | 6/1998 | Chen et al. |
| 5,764,789 A | 6/1998 | Pare, Jr. et al. |
| 5,781,724 A | 7/1998 | Nevarez et al. |
| 5,790,674 A | 8/1998 | Houvener et al. |
| 5,802,199 A | 9/1998 | Pare, Jr. et al. |
| 5,805,719 A | 9/1998 | Pare, Jr. et al. |
| 5,812,067 A | 9/1998 | Bergholz et al. |
| 5,812,819 A | 9/1998 | Rodwin et al. |
| 5,815,252 A | 9/1998 | Price-Francis |
| 5,815,598 A | 9/1998 | Hara et al. |
| 5,821,871 A | 10/1998 | Benzler |
| 5,825,005 A | 10/1998 | Behnke |
| 5,838,306 A | 11/1998 | O'Connor et al. |
| 5,838,812 A | 11/1998 | Pare, Jr. et al. |
| 5,844,497 A | 12/1998 | Gray |
| 5,872,834 A | 2/1999 | Teitelbaum |
| 5,881,226 A | 3/1999 | Veneklase |
| 5,887,140 A | 3/1999 | Itsumi et al. |
| 5,892,838 A | 4/1999 | Brady |
| 5,930,804 A | 7/1999 | Yu et al. |
| 5,933,498 A | 8/1999 | Schneck et al. |
| 5,987,232 A | 11/1999 | Tabuki |
| 5,991,877 A | 11/1999 | Luckenbaugh |
| 5,995,014 A | 11/1999 | DiMaria |
| 6,003,084 A | 12/1999 | Green et al. |
| 6,011,858 A | 1/2000 | Stock et al. |
| 6,012,039 A | 1/2000 | Hoffman et al. |
| 6,052,468 A | 4/2000 | Hillhouse |
| 6,070,243 A | 5/2000 | See et al. |
| 6,108,420 A | 8/2000 | Larose et al. |
| 6,108,779 A | 8/2000 | Dean et al. |
| 6,134,549 A | 10/2000 | Regnier et al. |
| 6,138,239 A | 10/2000 | Veil |
| 6,144,959 A | 11/2000 | Anderson et al. |
| 6,154,879 A | 11/2000 | Pare, Jr. et al. |
| 6,167,517 A | 12/2000 | Gilchrist et al. |
| 6,178,505 B1 | 1/2001 | Schneider et al. |
| 6,178,511 B1 | 1/2001 | Cohen et al. |
| 6,182,076 B1 | 1/2001 | Yu et al. |
| 6,182,131 B1 | 1/2001 | Dean et al. |
| 6,182,221 B1 | 1/2001 | Hsu et al. |
| 6,182,226 B1 | 1/2001 | Reid et al. |
| 6,219,439 B1 | 4/2001 | Burger |
| 6,256,737 B1 | 7/2001 | Bianco et al. |
| 6,317,836 B1 | 11/2001 | Goren et al. |
| 6,411,986 B1 | 6/2002 | Susai et al. |
| 6,618,806 B1 | 9/2003 | Brown et al. |
| 6,691,089 B1 | 2/2004 | Su et al. |
| 6,859,878 B1 * | 2/2005 | Kerr ..................... G06F 21/41 380/241 |
| 6,892,307 B1 * | 5/2005 | Wood ................... G06G 21/41 713/155 |
| 7,039,714 B1 | 5/2006 | Blakley, III et al. |
| 7,305,562 B1 | 12/2007 | Bianco et al. |
| 7,441,263 B1 | 10/2008 | Bakshi et al. |
| 7,660,880 B2 | 2/2010 | Ting et al. |
| 8,347,086 B2 | 1/2013 | Vican et al. |
| 2002/0032663 A1 | 3/2002 | Messner |
| 2002/0091924 A1 | 7/2002 | Vlcan et al. |
| 2002/0112170 A1 | 8/2002 | Foley et al. |
| 2002/0120582 A1 | 8/2002 | Elston et al. |
| 2002/0138728 A1 * | 9/2002 | Parfenov ............ H04L 63/0815 713/170 |
| 2002/0152078 A1 * | 10/2002 | Yuschik ................. G10L 17/14 704/273 |
| 2003/0149661 A1 | 8/2003 | Mitchell et al. |
| 2004/0030935 A1 | 2/2004 | Kai |
| 2004/0230807 A1 * | 11/2004 | Baird, III ............. H04L 63/083 713/182 |
| 2011/0191250 A1 | 8/2011 | Bishop et al. |
| 2013/0144783 A1 | 6/2013 | Bishop |

FOREIGN PATENT DOCUMENTS

| | | |
|---|---|---|
| WO | 9815924 | 4/1998 |
| WO | 9848538 | 10/1998 |
| WO | 9850875 | 11/1998 |
| WO | 9852317 | 11/1998 |

(56) References Cited

FOREIGN PATENT DOCUMENTS

| WO | 9857247 | 12/1998 |
|---|---|---|
| WO | 0054214 | 9/2000 |
| WO | 0165375 | 9/2001 |
| WO | 0171961 | 9/2001 |

OTHER PUBLICATIONS

Varadharajan et al, An Access Control Model and Its Use in Representing Mental Health Application Access Policy, 1996, IEEE, pp. 81-95.*
Blair et al, Plane Cover Multiple Access: A Media Access Control Strategy for Wireless Environments, 1998, IEEE, pp. 959-965.*
Valadon et al, Code-Division Multiple Access for Provision of Mobile Multimedia Services with a Geostationary Regenerative Payload, Feb. 1999, IEEE, vol. 17, No. 2, pp. 223-237.*
Declerq, Francis, "Voice Security Compares Features," Electronic Engineering Times, Mar. 15, 1999, p. 58(1), (Computer Select printout, Apr. 1999, 2 pages).
"Diebold ATMs First to Recognize Faces and Voices," ComputerWire, Inc., Section: Today's News, No. 3303, Dec. 3, 1997, 1 page.
Duksta, John C.C., We Know Who You Are, Network World, vol. 15, No. 34, Aug. 24, 1988, pp. 35-36 & pp. 38-41.
Forget Passwords, at http://forbes.com/penenberg/0208.htm, 2 pages (last visited May 7, 1999).
Halpin, Jon, "Bio-Identity," Computer Shopper, Ziff Davis Publishing Company, Mar. 1999, vol. 19, No. 3, p. 390(1), (Computer Select printout, Apr. 1999, 4 pages).
Karney, James, "Citadel Gatekeeper," PC Magazine, Ziff-Davis Publishing Company, Feb. 23, 1999, p. 174(1), (Computer Select printout, Apr. 1999, 2 pages).
Karney, James, "Saflink SAF/nt2.0," PC Magazine, Ziff-Davis Publishing Company, Feb. 23, 1999, p. 172(1), (Computer Select printout Apr. 1999, 2 pages).
Karney, James, "TrueFace Network," PC Magazine, Ziff-Davis Publishing Company, Feb. 23, 1999, p. 178(1), (Computer Select printout Apr. 1999, 2 pages).
Phillips, Ken, "Moving to Biometric Standards," PC Week, Oct. 27, 1997, p. 122 & p. 124.
Press Release, "Keyware Technologies Acquires Idtech," Mar. 24, 1999, 2 pages (Mar. 24, 1999).
"SAF/nt: Don't Worry, Be HA-API," Network World, Network World, Inc., Aug. 24, 1998, vol. 15, No. 34, p. 35(1), (Computer Select printout, Apr. 1999, 2 pages).
Schwartau, Winn, "Securing the Enterprise," Network World, Jan. 27, 1997, pp. 42-44 & p. 46.
"STMicro Chips will Include Biometrics," Electronic Engineering Times, CMP Publications, Inc., Jul. 6, 1998, No. 1015, p. 34(1), (Computer Select Printout), Apr. 1999, 1 page).
TrueTouch's Biometric Software Security Suiten™, at http://www.truetouch.com/prodinfo.html, 1 page (last visited May 7, 1999).
Keyware Technologies: Keyware Technologies Introduces the LBV Security Server, The Gale Group, 2001, 2 pages.
Keyware Technologies: The LBV® Server, at http://www.keyware.com, 2 pp. (last visited May 6, 1999).
Press Release, "TrueTouch Technologies, Inc. Introduces the 'Biometric Software Suite,'" 2 pp. (Apr. 20, 1998).
Avolio, Frederick M., "Identity Confirmed," Network World, vol. 18, No. 34, Aug. 24, 1998.
"Beyond Speech Recognition," Fortune, p. 264(1), Nov. 23, 1998 (Computer Select printout, Apr. 1999, 2 pp.).
"The Biometric Software Security Suite™," at http://www.truetouch.com/ttbsss.html, 2 pp. (last visited May 7, 1999).
Blake, Pat, "Invisible Protection," Computer World, vol. 30, No. 47, p. T6(4), Nov. 18, 1996 (Computer Select printout, Dec. 1996, 1 p.).
"Body Language," Computer Letter, p. 1(1), Nov. 30, 1998 (Computer Select printout, Apr. 1999, 5 pp.).
Carter, John and Nixon, Mark, "An Integrated Biometrics Database," pp. 8/1-8/5.
International Search Report, Application No. PCT/US01/03541, issued Apr. 26, 2001, 5 pp.
Brenner, B., "LAN Fever: How to Protect Your Business From Computer Viruses," Office Systems, Office Systems Magazine Corporation, Jan. 1992 [retrieved on May 20, 2002], 2 pp. Retrieved from the Internet: http://proquest.umi.com/pgdweb?Did=00000...4&Fmt=3&Deli=1&Mtd=1&Idx=1&Sid=3&RQT=309.
"Microsoft Press Computer Dictionary," Third Edition, Microsoft Press, p. 276 and p. 510, 1997.
International Search Report, Application No. PCT/US01/06499, 6 pp., issued Jun. 5, 2001.
International Search Report, Application No. PCT/US01/09188, 5 pp., issued Jun. 18, 2001.
International Search Report, Application No. PCT/US01/48374, 6 pp., issued Jun. 26, 2002.
"Keyware Technologies: Keyware Technologies Introduces the LBV Security Server," M2 Presswire, Jun. 25, 1998.
"Microsoft Computer Dictionary," p. 185, 1999.
"Merriam-Webster's Collegiate Dictionary," p. 992, 1999.
Written Opinion for Application No. PCT/US01/09188, issued Nov. 25, 2002, 6 pp.
"Keyware Technologies Layers-on Bio Security for Firms," Wall Street & Technology, Miller Freeman, Inc., vol. 16, p. 29(1), Dec. 1998.
Press Release, "Keyware Technologies Acquires ldtech," Mar. 24, 1999, 2 pages, (Mar. 24, 1999).

* cited by examiner

SYSTEM, METHOD AND COMPUTER PROGRAM PRODUCT FOR PROVIDING UNIFIED AUTHENTICATION SERVICES FOR ONLINE APPLICATIONS

CROSS-REFERENCE TO RELATED APPLICATIONS

This application is a continuation of and claims priority to U.S. patent application Ser. No. 12/232,167, entitled "System, Method and Computer Program Product for Providing Unified Authentication Services for Online Applications," filed on Sep. 11, 2008 which is a continuation of U.S. patent application Ser. No. 09/814,971, entitled "System, Method and Computer Program Product for Providing Unified Authentication Services for Online Applications," filed on Mar. 23, 2001, which claims priority to provisional application entitled "A System and Method for Providing Unified Authentication Services for Online Applications," U.S. Application No. 60/191,471, filed on Mar. 23, 2000, and to non-provisional application entitled "System, Method and Computer Program Product for Enrolling and Authenticating Communication Protocol-Enabled Clients for Access to Information," U.S. application Ser. No. 09/695,060, filed on Oct. 25, 2000, all of which are incorporated by reference in their entirety herein.

BACKGROUND OF THE INVENTION

1. Field of the Invention

The present invention relates generally to a system, method and computer program product for controlling access to information, and more particularly to providing unified authentication services in an Application Service Provider (ASP) setting to a registered end-user of one or more online (or web) applications.

The present invention also relates generally to a system, method and computer program product for allowing access to information, and more particularly to the enrollment and authentication of communication protocol-enabled clients for access to information, particularly confidential information, via a communication medium.

2. Background Art

The importance to the modern economy of rapid information access and exchange cannot be overstated. This explains the exponentially increasing popularity of the Internet, intranets, the wireless exchange of information, and so forth. The Internet is a world-wide set of interconnected computer networks that can be used to access a growing amount and variety of information electronically. The Internet today works especially well with the rapid access and exchange of public or non-confidential information.

One method of accessing information on the Internet is known as the World Wide Web (www, or the "web"). The web is a distributed, hypermedia system and functions as a client-server based information presentation system. The web supports documents that are formatted in a language called HyperText Markup Language (HTML). HTML documents support links to other documents, as well as graphics, audio, video files, and so forth. In addition, HTML controls how web pages are formatted and displayed. Computer users can access a web (or HTML) page using general-purpose computers, referred to as "clients," by specifying the uniform resource locator (URL) of the page. FIG. 1 is a network block diagram showing a plurality of clients and servers connected to the Internet.

The Internet's popularity can be contributed in part to tools or protocols that have been developed to allow any user to take advantage of what the Internet has to offer. These include, but are not limited to, web browsers, HTTP, S-HTTP, cookies and SSL. Each of these are discussed in more detail below.

A web browser is a software application that makes it easy for users to locate and display web pages. Examples of web browsers include Netscape Navigator and Microsoft's Internet Explorer. A web browser is one example of a communication protocol-enabled client, as described herein. Other examples of a communication protocol-enabled client may include, but is not limited to, a TCP/IP client and a wireless client.

A common protocol used by the web is the HyperText Transfer Protocol (HTTP). HTTP defines how messages are formatted and transmitted, and what actions web servers and browsers should take in response to various commands. For example, when a user enters a URL in his or her browser, this actually sends an HTTP command to the web server directing it to fetch and transmit the requested web page.

HTTP is called a stateless protocol because each command is executed independently, without any knowledge of the commands that came before it or after it. This is one reason why it is difficult to implement web sites that react intelligently to user input. This feature of HTTP has been addressed in a number of new technologies that compliment HTTP, including ActiveX, Java, JavaScript and cookies.

A cookie, for example, is a message given to a web browser by a web server. Cookies are a general mechanism which server side connections can use to both store and retrieve information on the client side of the connection. This addition of a simple, persistent, client-side state significantly extends the capabilities of web-based client/server applications.

A server, when returning an HTTP object to a user, may also send a piece of state information which the user will store. Included in that state object is a description of the range of URLs for which that state is valid. Any future HTTP requests made by the user which fall in that range will include a transmittal of the current value of the state object from the user back to the server. The state object is a cookie. This simple mechanism provides a powerful tool which enables a host of new types of applications to be written for web-based environments. Shopping applications can now store information about the currently selected user items, for-fee services can send back registration information and free the user from retyping a username (or user ID) on the next connection, sites can store per-user preferences on the user computer and have the user supply those preferences every time a connection is made to that site, and so forth.

Another common protocol used on the web is the Secure Sockets Layer (SSL) protocol. SSL is a protocol used for transmitting private documents via the Internet. SSL works by using a private session key that is known only to the web browser for that particular session. The session key changes for each session. The session key is used to encrypt data that is transferred over the SSL connection. Many web sites use the SSL protocol to obtain confidential user information, such as credit card numbers.

Another protocol for transmitting data securely over the web is Secure HTTP (S-HTTP). Whereas SSL creates a secure connection between a client and a server over which any amount of data can be sent securely, S-HTTP is designed to transmit individual messages securely. SSL and S-HTTP, therefore, can be seen as complementary rather than competing technologies.

As stated above, the importance to the modern economy of rapid information access and exchange cannot be overstated. The popularity of the Internet has been enhanced through web browsers and the various protocols mentioned above. (The popularity of intranets and wireless communication has also been enhanced through protocols specific to each.) The rapid exchange of non-confidential information via the Internet has served users well. However, there are some problems. One problem is the protection of confidential information via the Internet. Another problem is satisfying the comfort level in individual users that their confidential information via the Internet remains confidential when they subscribe to and use online (or web) applications.

The importance of satisfying the comfort level of users increases as the applications or services provided to users via the Internet necessitates the access or exchange of confidential user information. Examples of such applications or services include business-to-business and business-consumer-e-commerce transactions, online applications such as banking, stock-trading, shopping, personalized content web sites, and so forth. To avoid providing confidential information to the wrong user, the user (or communication protocol-enabled client such as a web browser) must be authenticated before the user accesses a web application. While the ease of information access and exchange is attractive to all users, most users are also concerned with the security of their confidential information accessible via the Internet, an intranet, a wireless network, and so forth.

So as to not offset the increase in the popularity of the Internet for information access and exchange, an Internet provider of information needs to balance adequate confidential information protection with the ease of information access and exchange over the Internet. In addition, registered users of web applications should have some control over the level of protection provided to their accounts managed by web applications to ensure adequate user comfort levels are achieved. Also, the user should only have to enroll once (i.e., provide his or her credentials) and then have these credentials reused for authentication to all of the user's accounts.

BRIEF SUMMARY OF THE INVENTION

A system, method and computer program product for controlling access to information, and more particularly to providing unified authentication services in an Application Service Provider (ASP) setting to a registered end-user of one or more online applications.

The system for remotely enrolling, authenticating and providing unified authentication services in an ASP setting to a user to access requested information via a communication medium includes client side components. Also included in the system is a filter coupled to the client side components via the communication medium and a user management component coupled to the client side components via the communication medium. The user management component allows end-users to register their credentials once. In addition, the user management component allows end-users to define the level of protection of access to their web application accounts. This includes, but is not limited to, accounts that have been configured specifically for used with the present invention and particular user credentials and accounts that have been subsequently set up but configured to use the same user credentials. The present invention then reuses those credentials to authenticate the user to one or more potentially unrelated web applications.

The system also includes server side components coupled to the filter and to the user management component via the communication medium. The client side components include an authentication control component that manages the process of capturing user credentials and communicates the result of the capturing process to the filter. The server side components include an authentication server. The authentication server stores data related to a plurality of users and at least one policy that is associated with the user. The user policy defines an authentication level where the authentication level defines the probability that the user is authorized to access the requested information. In addition, the authentication server receives the user credentials from the filter, attempts to authenticate the user by executing the user policy and communicates to the filter whether the user is authenticated. Finally, the filter interacts with a server containing the requested information once the user is authenticated by the authentication server.

To allow for the remote enrollment of the user, the present invention provides client side components that include an authentication control component and an enroll application. The enroll application is responsible for driving presentation logic that interacts with the user when presenting user credentials. The authentication control component is responsible for managing the process of capturing user credentials and communicating the result of the capturing process to the server side components.

The present invention is also a system, method and computer program product for allowing access to information, and more particularly to the enrollment and authentication of communication protocol-enabled clients for access to information, particularly confidential information, via the Internet.

The system includes client side components, a filter coupled to the client side components and server side components coupled to the filter. The client side components include an authentication control component that manages the process of capturing user credentials and communicates the result of the capturing process to the filter. The server side components include an authentication server, wherein the authentication server stores therein data related to a plurality of users and at least one policy that is associated with the user. The authentication server receives the user credentials from the filter, attempts to authenticate the user by executing the user policy and communicates to the filter whether the user is authenticated.

Finally, the filter interacts with a server containing the requested information (e.g., a web or application server that hosts the application that the user is requesting information from) once the user is authenticated by the authentication server. To allow for the remote enrollment of the user, the client side components include an authentication control component and an enroll application. The enroll application is responsible for driving presentation logic that interacts with the user when presenting user credentials.

An embodiment of the invention is a system for authenticating a user to access requested information via a communication medium, comprising: client side components; a filter coupled to said client side components via the communication medium; and server side components coupled to said filter via the communication medium, wherein said client side components include an authentication control component that manages the process of capturing user credentials and communicates the result of capturing said user credentials to said filter. The server side components include an authentication server, wherein said authentication server stores therein data related to a plurality of users and at least one policy that the user is associated with, said policy defining an authentication level, said authentication level defining a probability that the user is authorized to access the requested information, and wherein said authentication server receives said user credentials from said filter, attempts to authenticate the user by executing said policy and communicates to said filter whether the user is authenticated, and wherein said filter interacts with a server containing the requested information once the user is authenticated by said authentication server. The server may be a web server or an application server, and the authentication control component may be checked for integrity each time it is invoked.

A further embodiment is a system for allowing a user to remotely enroll user credentials via a communication medium in order to access requested information, comprising: client side components; a filter coupled to said client side components via the communication medium; and server side components coupled to said filter via the communication medium. The client side components include an authentication control component and an enroll application, said enroll application is responsible for driving presentation logic that interacts with the user when presenting user credentials, said authentication control component is responsible for managing the process of capturing user credentials and communicating the result of capturing said user credentials to said server side components. The server side components include an authentication server, wherein said authentication server stores therein data related to a plurality of users and at least one policy that the user is associated with, said policy defining an authentication level, said authentication level defining a probability that the user is authorized to access the requested information, and wherein said authentication server stores said user credentials.

A further embodiment is a method for authenticating a user to access requested information via a communication medium, comprising the steps of storing, in an authentication server, data related to a plurality of users and at least one policy that the user is associated with, said policy defining an authentication level, said authentication level defining a probability that the user is authorized to access the requested information. The method includes further managing, via an authentication control component, the process of capturing user credentials; communicating, from said authentication control component to a filter via the communication medium, the result of capturing said user credentials; communicating, from said filter to said authentication server via the communication medium, said user credentials; determining, by said authentication server, whether the user is authenticated by executing said policy; communicating, from said authentication server to said filter via the communication medium, whether the user has been authenticated; and interacting, by said filter, with a server containing the requested information if the user was authenticated by said authentication server.

A further embodiment is a method for allowing a user to remotely enroll user credentials via a communication medium in order to access requested information, comprising the steps of: storing, in an authentication server, data related to a plurality of users and at least one policy that the user is associated with, said policy defining an authentication level, said authentication level defining a probability that the user is authorized to access the requested information. The method further includes driving presentation logic, by an enroll application that interacts with the user when presenting user credentials; managing, via an authentication control component, the process of capturing user credentials; communicating, from said authentication control component to said authentication server via the communication medium, the result of capturing said user credentials; and storing in said authentication server said user credentials.

Another embodiment is a system for authenticating a user to access requested information via a communication medium, comprising: client side components; and server side components coupled to said client side components via the communication medium, wherein said client side components include an authentication control component that manages the process of capturing user credentials and communicates the result of capturing said user credentials to said server side components. The server side components include an authentication server and a filter, wherein said authentication server stores therein data related to a plurality of users and at least one policy that the user is associated with, said policy defining an authentication level, said authentication level defining a probability that the user is authorized to access the requested information, and wherein said authentication server receives said user credentials from said filter, attempts to authenticate the user by executing said policy and communicates to said filter whether the user is authenticated, and wherein said filter interacts with a server containing the requested information once the user is authenticated by said authentication server.

A further embodiment is a method for authenticating a user to access requested information via a communication medium, comprising the steps of: storing, in an authentication server, data related to a plurality of users and at least one policy that the user is associated with, said policy defining an authentication level, said authentication level defining a probability that the user is authorized to access the requested information. The method further includes managing, via an authentication control component, the process of capturing user credentials; communicating, from said authentication control component to said authentication server via the communication medium, the result of capturing said user credentials; determining, by said authentication server, whether the user is authenticated by executing said policy; and communicating, from said authentication server to a server containing the requested information via the communication medium, whether the user has been authenticated.

BRIEF DESCRIPTION OF THE FIGURES

The present invention will be described with reference to the accompanying drawings, wherein.

DETAILED DESCRIPTION OF THE INVENTION

A. Overview of the Invention

Figure 1:
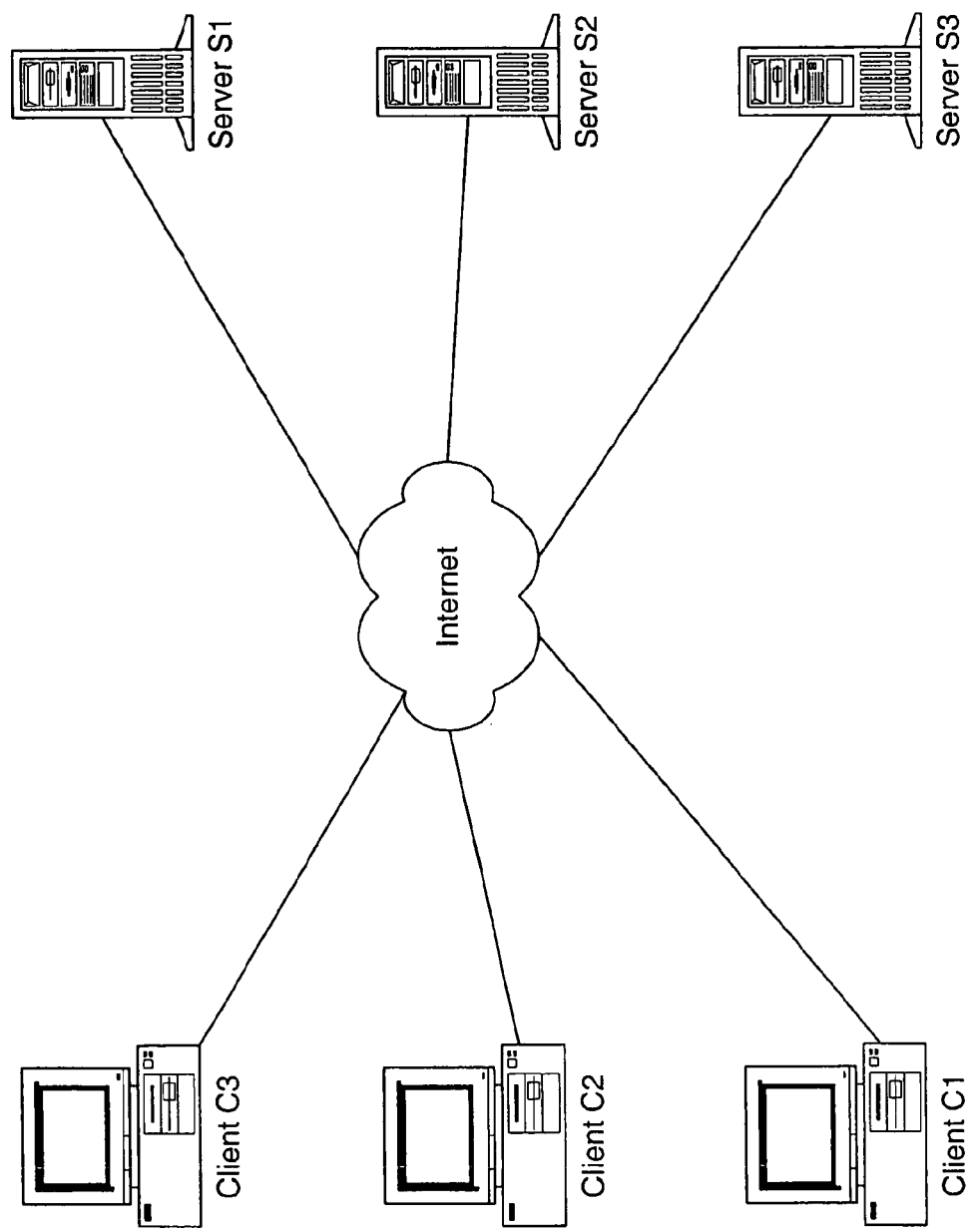
FIG. 1 is a network block diagram showing a plurality of clients and servers connected to the Internet.

The inventors of the present invention recognized that a solution did not exist that effectively balances protection of confidential information defined by end-users with the ease of access to the same confidential information via a communication medium, such as the Internet. It is important to note that while the present invention is described with reference to the Internet, it is not meant to limit the present invention. The present invention also applies to intranets, wireless networks, and so forth.

The general solution of the present invention to the above stated problem is threefold. First, use as adequate an identification device as possible to protect confidential information available on the Internet.

Second, provide a system, method and computer program product that utilizes the adequate identification device to provide effective authentication of the user to Internet-accessible (or web) applications and/or services that manage the confidential information.

And third, allow registered end-users of web applications to have some control over the level of protection provided to their accounts to ensure adequate user comfort levels are achieved. This requires providing a user management application that aids in centrally storing and managing all user credentials. The user management application works to cater to end-users to allow the user to enroll once (i.e., provide his or her credentials) and reuse the stored credentials for authentication to one or more web applications. For example, assume that a user "Jane" has an account with a service that offers package vacations at a discount called discount vacation.com and an account with an online banking institution called bankonline.com. It is likely that Jane would desire a higher level of authentication to access her online banking account than her account that lists discounted vacation packages. Therefore, Jane may decide to protect her online banking account with a policy that requires her to pass a fingerprint scanner, a voice recognition system and a face recognition system to access her account. Whereas, Jane may only want to protect her discounted vacations account with a fingerprint scanner. Jane will be required by the present invention to provide her credentials once, which include a fingerprint measurement, a voice measurement and a face measurement. Then, her fingerprint measurement will be reused for access to both her online banking account and her discounted vacations account.

In an embodiment, the present invention is implemented in an Application Service Provider (ASP) setting. In general, an ASP is a third-party entity that manages and distributes software-based services and solutions to customers across a wide area network from a central data center.

The solution must not decrease the popularity of the Internet in terms of the ease of rapid information access and exchange currently provided by the Internet. More specifically, the architecture of the system of the present invention must be a cross-platform, high performance, extensible, and highly scalable solution for authenticating communication protocol-enabled clients, as well as remotely enrolling the credentials of communication protocol-enabled clients.

Billions of dollars have been lost by thousands of E-commerce businesses, Internet data content providers, etc., due to inadequate authentication to, and thus inadequate protection of, confidential information. Many users do not feel comfortable with having their confidential information accessible via the Internet. Therefore, when it comes to confidential information, these users may give up the ease of use of the Internet and resort to more traditional types of businesses or services that are not Internet-accessible.

Today, web applications control what kinds of credentials a registered user must provide in order to access his or her account. For most web applications, the required credentials are minimal. For example, most web applications/services authenticate a user via a username and password only. Other identification devices include, but are not limited to, smart cards, tokens, and various biometric devices (e.g., fingerprint scanners, voice or face recognition systems, and so forth). In addition, most web applications reduce the cost and complexity of administering its confidential data protection by incorporating a process called "single sign-on" involving a password only.

Single sign-on provides each user with one password to access all web application resources (including public or non-confidential information and confidential information). Most users can remember one password without writing it down. While this reduces the complexity and cost of administering information protection, it reduces the probability that the user gaining access to the information is authentic. While single sign-on using a password is acceptable to authenticate users who access non-confidential information, single sign-on using a password is not acceptable to authenticate users who access confidential information, in addition to other types of information. The probability that the user gaining access is authentic can be increased by forcing each user to use multiple passwords, tokens, smart cards or biometric devices to access different types of information (e.g., confidential versus non-confidential information).

B. System Architecture Overview

Figure 2:
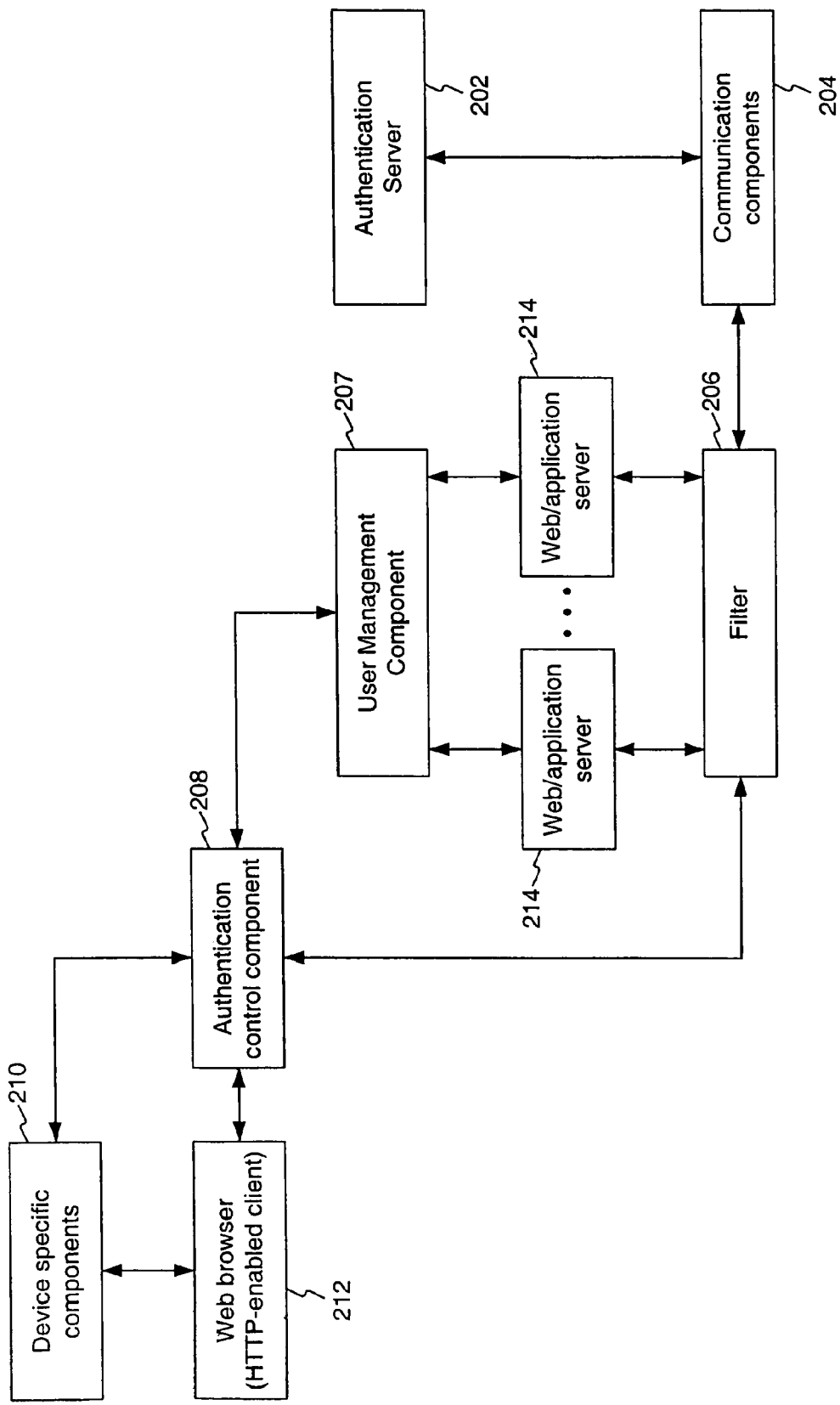
FIG. 2 is a block diagram representing an example operating environment of the present invention according to an embodiment.

FIG. 2 is a block diagram representing an example operating environment of the present invention. It should be understood that the example operating environment in FIG. 2 is shown for illustrative purposes only and does not limit the invention. Other implementations of the operating environment described herein will be apparent to persons skilled in the relevant art(s) based on the teachings contained herein, and the invention is directed to such other implementations. Referring to FIG. 2, an authentication server 202, communication components 204, a filter 206, a user management component 207, an authentication control component 208, device specific components 210, a web browser 212 and one or more of web/application server 214 is shown.

An embodiment of the functional modules or components of the present invention includes authentication server 202, communication components 204, filter 206, a user management component 207 and authentication control component 208. The components of the present invention can each be classified under the following categories including: client side components; filter component; user management component; server side components and remote enrollment components. Authentication server 202 and communication components 204 are classified as server side components. Authentication control component 208, along with device specific components 210 and web browser 212, is classified as client side components. Filter 206 is classified as a filter component. User management component 207 is classified as a user management component. Finally, authentication control component 208 and communication components 204 are classified as remote enrollment components.

In an embodiment of the present invention, the server side components and the remote enrollment components are designed to be platform independent and only require that the communication with them be done over a standard, published protocol (e.g., HTTP protocol (RFC 2068)). Note that authentication control component 208 is classified as both a client side component and a remote enrollment component. In addition, communication components 204 are classified as both a server side component and a remote enrollment component. The reuse of these components in different classifications (or functions) of the present invention is the result of implementing the components in an object oriented programming language.

An advantage of any object-oriented program is that it enables programmers to create modules (that perform functions) that do not have to be changed when a new type of object is added. An object includes both the data and functions required to perform a task. Thus, by implementing the functions to be performed by the components of the present invention as objects, created modules do not need to be changed when a new type of object (or function) is added. This implementation of the present invention reduces complexity and thus increases efficiency. The categories (and their respective components) of the present invention are described next.

1. Server Side Components

As stated above, authentication server 202 and communication components 204 are classified as server side components. Authentication server 202 is connected to communication components 204 (see FIG. 2). Authentication server 202 is described in detail in related, co-pending U.S. application Ser. No. 09/264,726 and U.S. application Ser. No. 09/517,121 (see, "Cross-Reference to Related Applications" above). For convenience, authentication server 202 is briefly described next.

Authentication server 202 is the engine of the present invention and stores collections of data required by the present invention. Both the functions of the engine and the data stored in authentication server 202 will be discussed in further detail below. The types of data stored in authentication server 202 are partially determined through the operations of an enrollment station and an administration station (not shown). The enrollment station is used to enroll users that are to be authenticated by the present invention. The enrollment station has attached to it every type of device (e.g., biometric devices like fingerprint scanners, voice or face recognition systems, etc., or security tokens such as RSA tokens, VASCO tokens, and so forth) used by the present invention to enroll and ultimately authenticate users. When a user is enrolled into the present invention, the user may be enrolled with as many devices as the administrator deems necessary.

The administration station is used by the administrator of the present invention to perform overall management duties. The administrator can also use the administration station to generate various reports. The reports may include a list of different types of data stored in authentication server 202 (e.g., a list of the currently enrolled users in the present invention). In addition, the administration station is typically used to setup the initial data in authentication server 202.

Another component that may be used by the present invention is the satellite enrollment station, also not shown in FIG. 2. The satellite enrollment station is used to enroll users into the present invention at remote locations. The satellite enrollment station may have as many devices attached to it as the administration station, but alternatively may also be a scaled down version of the administration station. As will be described in detail below, the present invention allows for web browsers (i.e., communication protocol-enabled clients) to act as remote enrollment stations.

Authentication server 202 also includes authentication components (i.e., authentication objects) that are not shown in FIG. 2. Authentication components interact with communication components 204 to provide the necessary function to perform user authentication. Authentication components will be described in more detail below.

As will be described with reference to the remote enrollment components of the present invention, authentication server 202 also includes enrollment components (not shown in FIG. 2) that interact with communication components 204 to provide the necessary function to perform remote enrollment.

As stated above, authentication server 202 is connected to communication components 204. Communication components 204 include different types of objects that perform specific functions, including a listen object and a comm object (which are described below). These types of objects are used to provide the necessary communication by the present invention when the user is attempting to be authenticated. As stated above, the present invention provides a solution that effectively balances the protection of confidential information with the ease of access to the same confidential information via a communication medium, such as the Internet. It is important to note that while the present invention is described with reference to the Internet, it is not meant to limit the present invention. The present invention also applies to intranets, wireless networks, and so forth. Depending on the type of communication medium, communication components 204 perform the necessary communication functions to authenticate the user via that particular medium. This is shown with reference to FIGS. 4, 5A and 5B.

Figure 4:
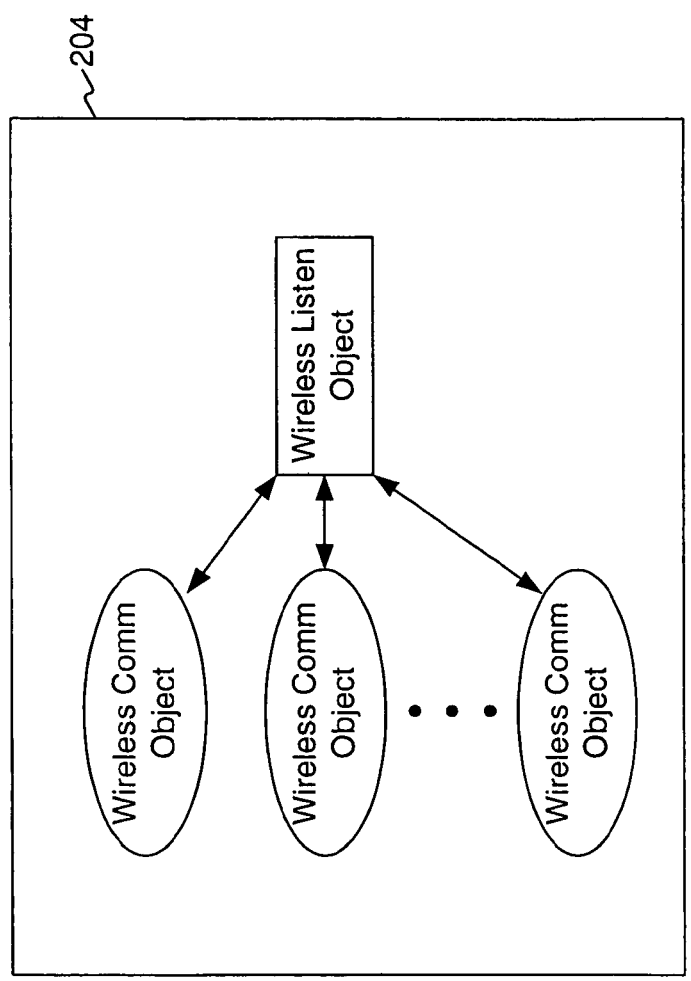
FIG. 4 illustrates the communication components performing the necessary functions required when the communication protocol is a wireless communication protocol according to an embodiment of the present invention.
Figure 5A:
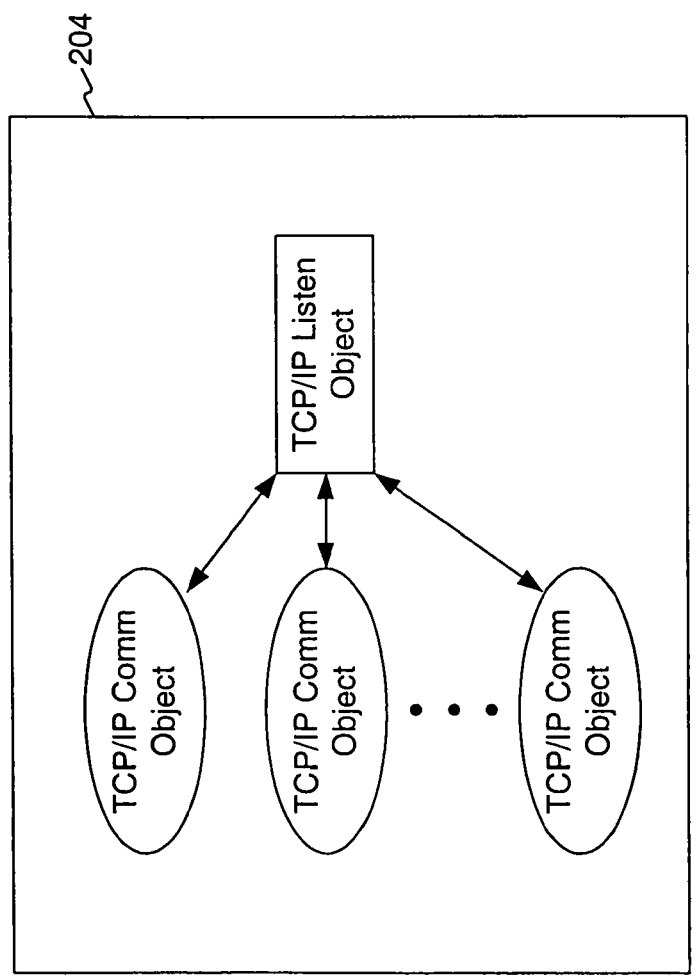
FIG. 5A illustrates the communication components performing the necessary functions required when the communication protocol is for a local network or an intranet according to an embodiment of the present invention.
Figure 5B:
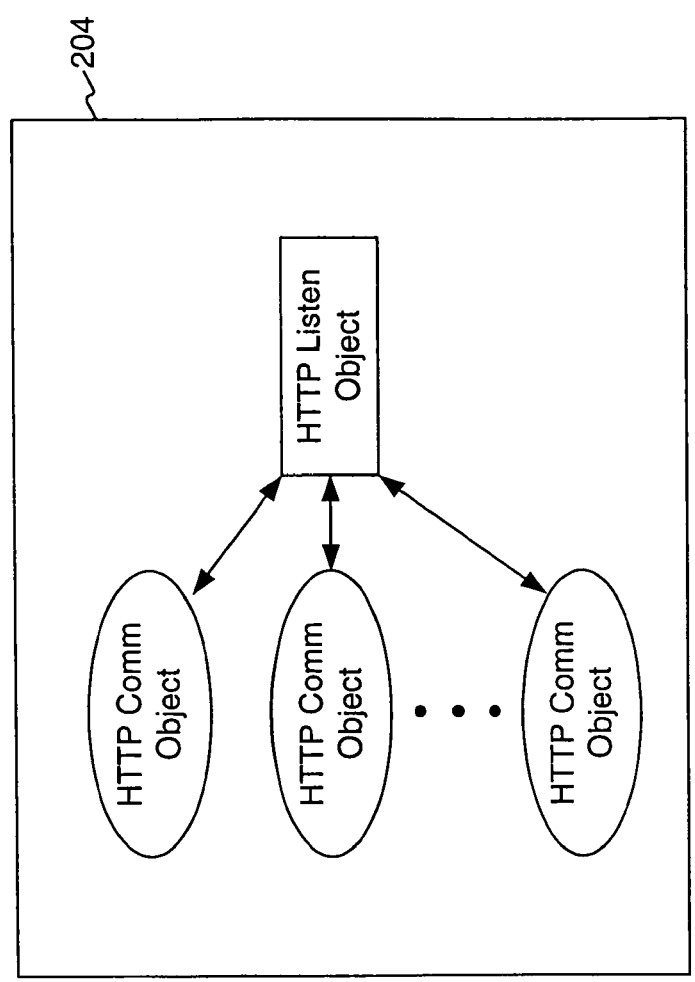
FIG. 5B illustrates the communication components performing the necessary functions required when the communication protocol is for the Internet according to an embodiment of the present invention.

In FIG. 4, communication components 204 perform the necessary functions for a wireless network. FIG. 5A illustrates communication components 204 performing the necessary functions for a local network or intranet. Finally, FIG. 5B illustrates communication components 204 performing the necessary functions for the Internet. Communication components 204, authentication components, and how they interact with each other, will be described next with the communication medium being the Internet, although the present invention is not limited to the Internet.

a. Communication Components—Listen object

Figure 6:
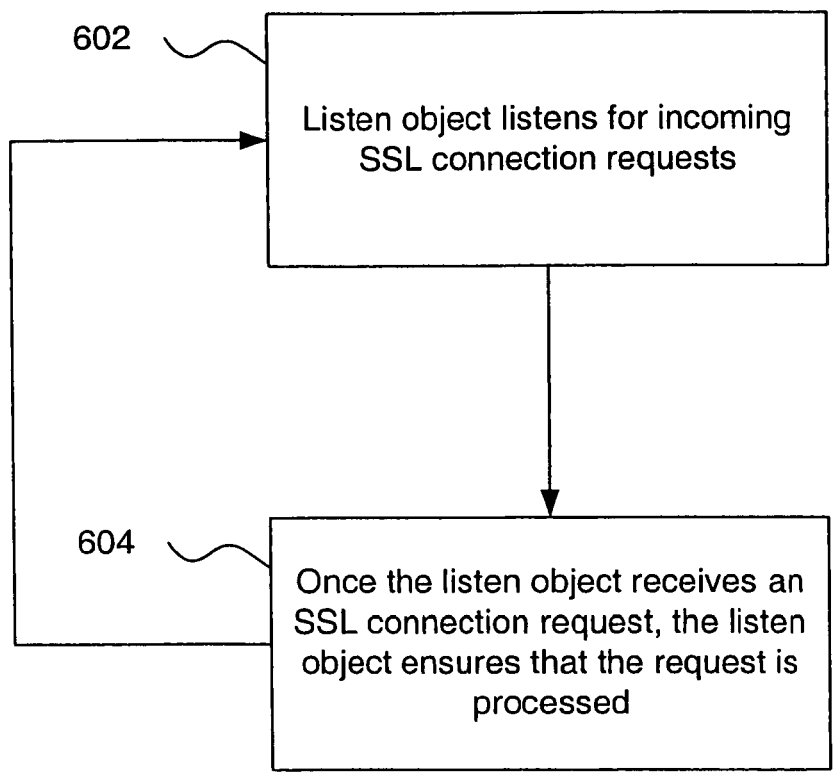
FIG. 6 illustrates tasks of the listen object of the authentication function according to an embodiment of the present invention.

The listen object is instantiated by authentication server 202 at the time it starts up. The listen object is responsible for the following tasks as illustrated by FIG. 6. In FIG. 6 the flowchart starts at step 602. Once instantiated, the listen object acts like a HTTP daemon listening on the standard SSL port (i.e., port 443) for incoming SSL connection requests, as illustrated by step 602. Control then passes to step 604.

In step 604, once the listen object receives a SSL connection request, the listen object ensures that the request is processed by the comm object, as described below. Control then passes back to step 602, where the listen object listens for incoming SSL connection requests. The listen object is only destroyed once authentication server 202 is turned off There are different ways in which the listen object ensures that the request is processed in step 604. For example, in an embodiment of the present invention the listen object may be implemented as a standard daemon-thread, worker-thread-pool model where a single daemon thread accepts all incoming connection requests and hands off the newly created socket (for each connection) to one of the worker threads in the pool. The daemon thread can then go back to listening for more incoming connections. The number of threads in the pool may be a configurable parameter. Threads are well known in the relevant art.

In another embodiment of the present invention, the listen object may use an JO Completion Port to provide a single point of receiving requests from and transmitting responses to clients. This technique also lends naturally to asynchronous communication mechanisms, which have been shown to improve performance of I0 centric processes. 10 Completion Ports and asynchronous communication mechanisms are also well known in the relevant art. The comm object of the present invention will be discussed next.

b. Communication Components—Comm object

Figure 7:
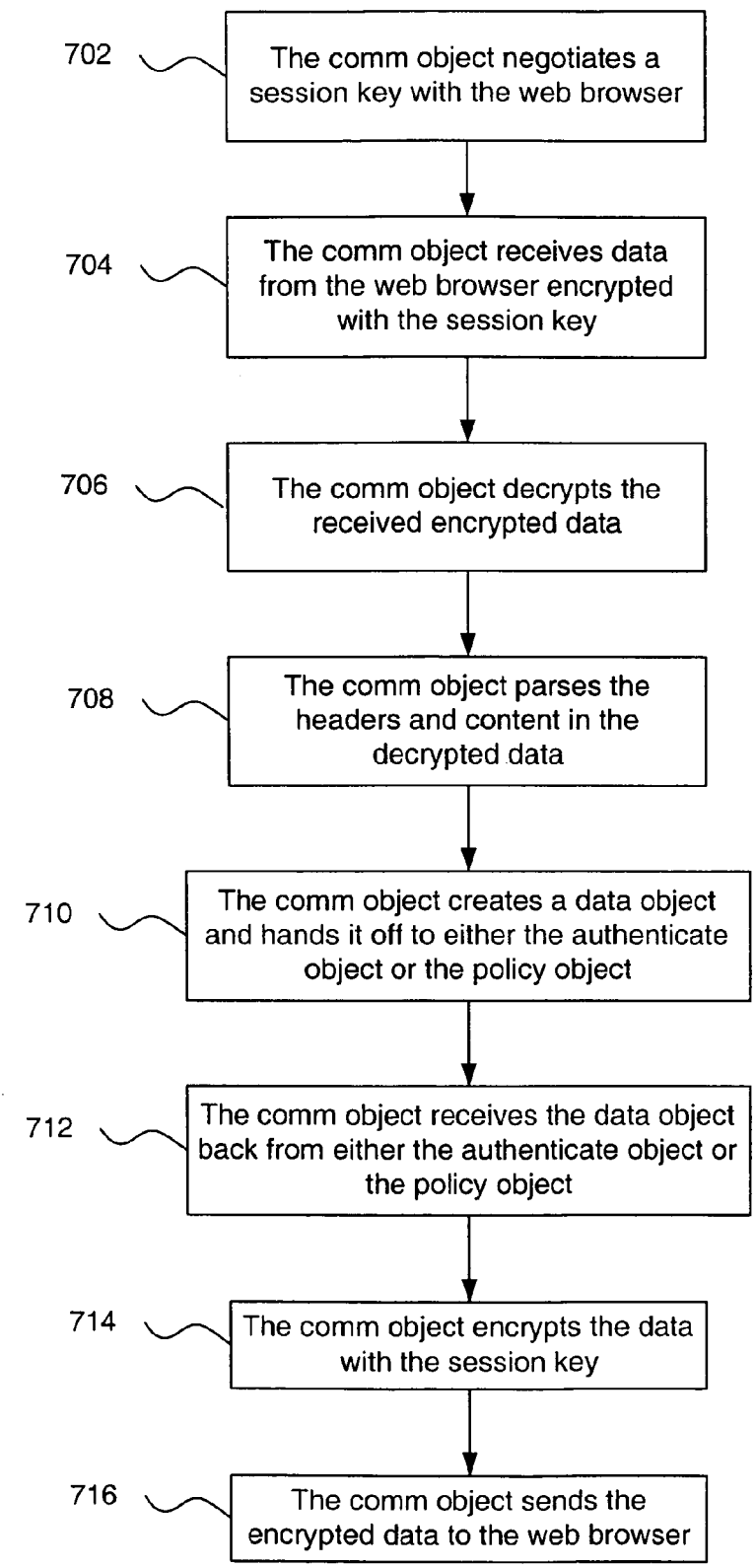
FIG. 7 illustrates tasks of the comm object of the authentication function according to an embodiment of the present invention.

A comm object is instantiated for each new client session. A client session results when a user at web browser 212 attempts to access web/application server 214. Once the authentication process is completed, an error occurs, or a timeout occurs, the corresponding comm object is destroyed. The comm object is responsible for the following tasks as illustrated by FIG. 7. In FIG. 7, the flow begins at step 702. In step 702, the comm object negotiates a session key with web browser 212 for symmetric encryption/decryption of data. This may involve exchanging of server-side certificates as well as client-side certificates. Control then passes to step 704.

In step 704, the comm object receives data from web browser 212 encrypted with the session key. Control then passes to step 706.

In step 706, the comm object decrypts the data received in step 704. Control then passes to step 708.

In step 708, the comm object parses the HTTP headers and content in the decrypted data. Control then passes to step 710.

In step 710, the comm object creates a data object conforming to a specific format from the received data and hands it off to the authentication components of authentication server 202 (i.e., authenticate object) or a policy object (via the authenticate object). Policy objects are explained in detail in related, co-pending U.S. application Ser. No. 09/264,726 and U.S. application Ser. No. 09/517,121. A policy object differs depending on the specific policy being used. It is policy that determines the method or way in which a user is to be authenticated by the authentication components of authentication server 202. It is important to note that a user is not authenticated until he or she passes the appropriate policy. In the present invention, a user is never authenticated by solely passing one or more devices without also passing his or her policy. Policies will be discussed further below. Control then passes to step 712.

In step 712, the comm object receives the data object back from the authenticate object or the policy object and formats it according to HTTP specifications. Control then passes to step 714.

In step 714, the comm object encrypts the data with the session key to be sent back to web browser 212. Control then passes to step 716.

In step 716, the comm object sends the encrypted data to web browser 212. It is important to note that some or all of the above steps may be repeated several times if the policy requires multi-factored authentication. The flowchart in FIG. 7 ends at this point. As stated above, the comm object is destroyed once the authentication process is completed, if an error occurs, or if a timeout occurs. The authentication components (i.e., authenticate object) of the present invention is described next.

c. Authentication Components—Authenticate object

Figure 8:
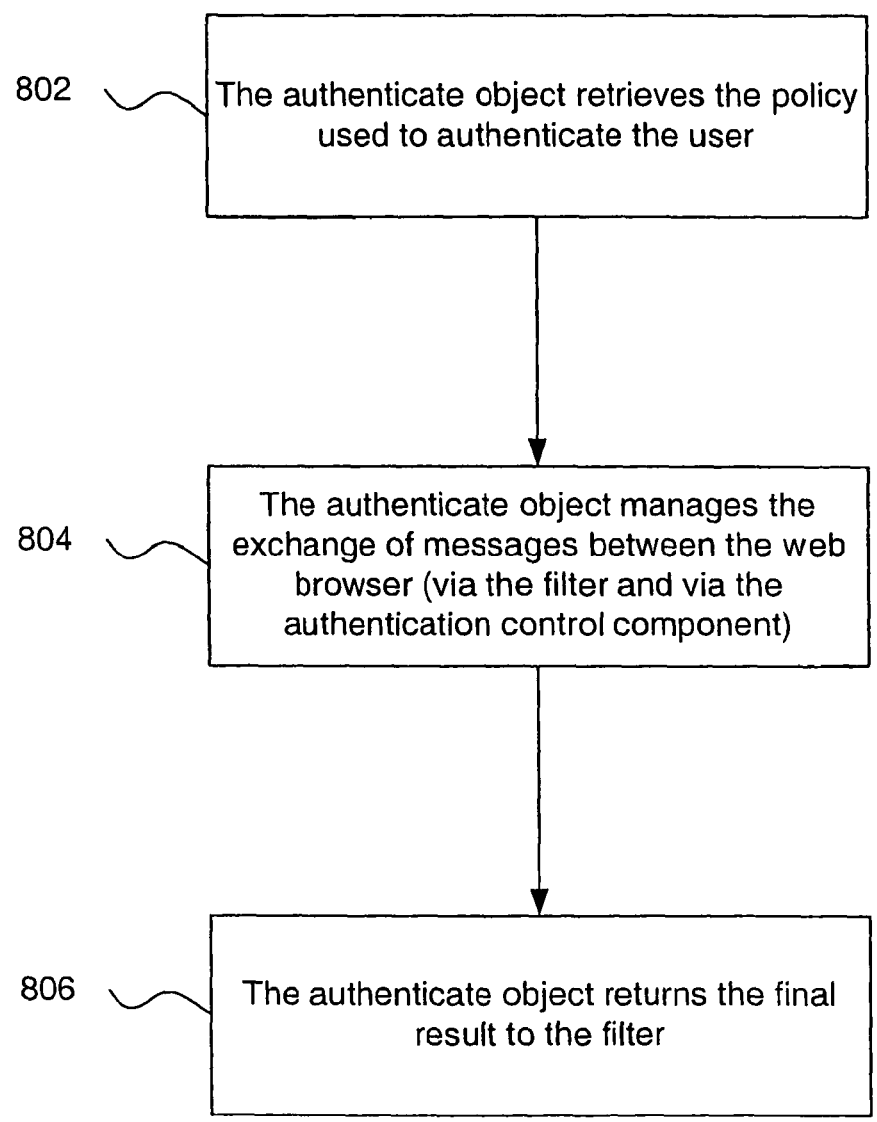
FIG. 8 illustrates tasks of the authenticate object of the authentication function according to an embodiment of the present invention.

The authenticate object is also instantiated for each new client session. As with the communication objects described above, authentication objects may also be communication medium specific. The tasks of the authenticate object is illustrated in FIG. 8. In FIG. 8, control starts at step 802. In step 802, the authenticate object retrieves the policy (or policy object) from the database (or database object) that is to be used to authenticate the user. Control then passes to step 804.

In step 804, the authenticate object informs communication components 204 of all necessary messages that are required for communication with web browser 212 (via filter 206 and via authentication control component 208). Once the authentication message exchange is complete, control passes to step 806.

In step 806, the authenticate object returns the final result to filter 206 (via communication components 204), which in turn interacts with server/web application 214 to allow (or disallow) access to the user. The interaction between filter 206 and server/web application 214 to hand-off control of the access with the user is referred to by the present invention as integration. The flowchart in FIG. 8 ends at this point. The client side components of the present invention are described next.

2. Client Side Components

Authentication control component 208, along with device specific components 210 and web browser 212, are classified as client side components by the present invention. Device specific components 210 are software libraries and other components that are specific to an identification device (e.g., biometric devices like fingerprint scanners, voice or face recognition systems, etc., or security tokens such as RSA tokens, VASCO tokens, and so forth). Device specific components 210 are typically shipped by the device manufacturers and usually include an Application Programming Interface (API) that can be used to interface with the device. API's are well known in the relevant art.

Authentication control component 208 works in conjunction with device specific components 210 to manage the process of capturing a user credential, doing any local processing that is necessary and communicating the result of this processing to filter 206. For example, authentication control component 208 can be implemented as ActiveX control for certain web browsers (e.g., Internet Explorer) and implemented as a plug-in that contains the same logic as the Active X control for other web browsers (e.g., Netscape).

The client side components of the present invention provide two features including software integrity and one-time download. Once authentication control component 208 is downloaded on the client computer or machine, malicious users may tamper with it. To prevent this, client software integrity is checked each time before authentication control component 208 is used. This may be accomplished by performing a hash on the code for authentication control component 208, as well as the code for device specific components 210. If any changes are discovered, then the original code for authentication control component 208 and/or device specific components 210 are downloaded before the authentication of the present invention proceeds.

The one-time download feature of the present invention deals with the fact that a particular version of authentication control component 208 is downloaded only once on a user's computer, either at enrollment time or the first time the user tries to authenticate from a computer that does not have authentication control component 208. Thereafter, each new version of authentication control component 208 is also downloaded only once on the user's computer. The filter component is described next.

3. Filter Component

Filter 206 is a lightweight component that resides with web/application server 214 (i.e., any web server or application server that requires the authentication services of the present invention). The code for filter 206 is preferably written in the native language (e.g., C, C++, Java, etc) of web/application server 214 for optimum performance. In one embodiment of the present invention, filter 206 looks at all requests sent from web browser 212 and intercepts any request for authentication from web browser 212. Filter then forwards the authentication requests to authentication server 202.

Filter 206 is designed to interoperate with existing web servers including, but not limited to, Netscape Enterprise Server (NES), Microsoft Internet Information Server (MS IS), Apache, etc., to provide authentication services for accessing web sites. Filter 206 may also be used with application servers including, but not limited to, BEA Web-Logic, SilverStream Application Server, Oracle AppServer, Sun NetDynamics, Microsoft Site Server, etc., to provide authentication services for web applications including online banking, online stock trading, and so forth. As shown in FIG. 2, filter 206 is connected to one or more of web/application server 214. Web/application 412 represents both a web server and an application server as mentioned above. Remote enrollment components of the present invention are described next.

4. Remote Enrollment Components

The present invention allows users to register their credentials remotely (over the Internet, intranets, wireless networks, and so forth). The remote enrollment components of the present invention include authentication control component 208, communication components 204 and a middle-tier enroll application. As mentioned above, authentication control component 208 may also be used for enrollment as well as authentication (client side component). As described above, communication components 204 include a listen object and a comm object. Here, communication components 204 interact with the enrollment components of authentication server 202 (i.e., enroll objects, which is the counterpart of authentication object described above). This allows "one-time" download of authentication control component 208 either at the time of enrollment, or if the user moves to a different computer than the one they enrolled on, authentication control component 208 is downloaded the first time the user tries to authenticate from that different computer.

The remote enrollment functionality of the present invention requires authentication control component 208 to capture the user's credentials (e.g., biometric measurement, password, etc.) and send the credentials to the enroll object to be stored in the database of authentication server 202 for future authentication of the user by the present invention.

The enroll application drives the presentation logic of the remote enrollment process. The enroll application is responsible for creating the user visible HTML that is viewed in web browser 212. Several technologies may be used to implement the user visible HTML including, but not limited to, Active Server Pages (ASP), Java Server Pages (JSP), JAVA Servlets, Microsoft ISAPI and Netscape NSAPI. The enroll application acts as the go-between authentication control component 208 on one side and the listen object, the comm object and the enroll object on the other side. The tasks of the listen object, the comm object and the enroll object are described next.

a. Communication Components—Listen Object

Figure 9:
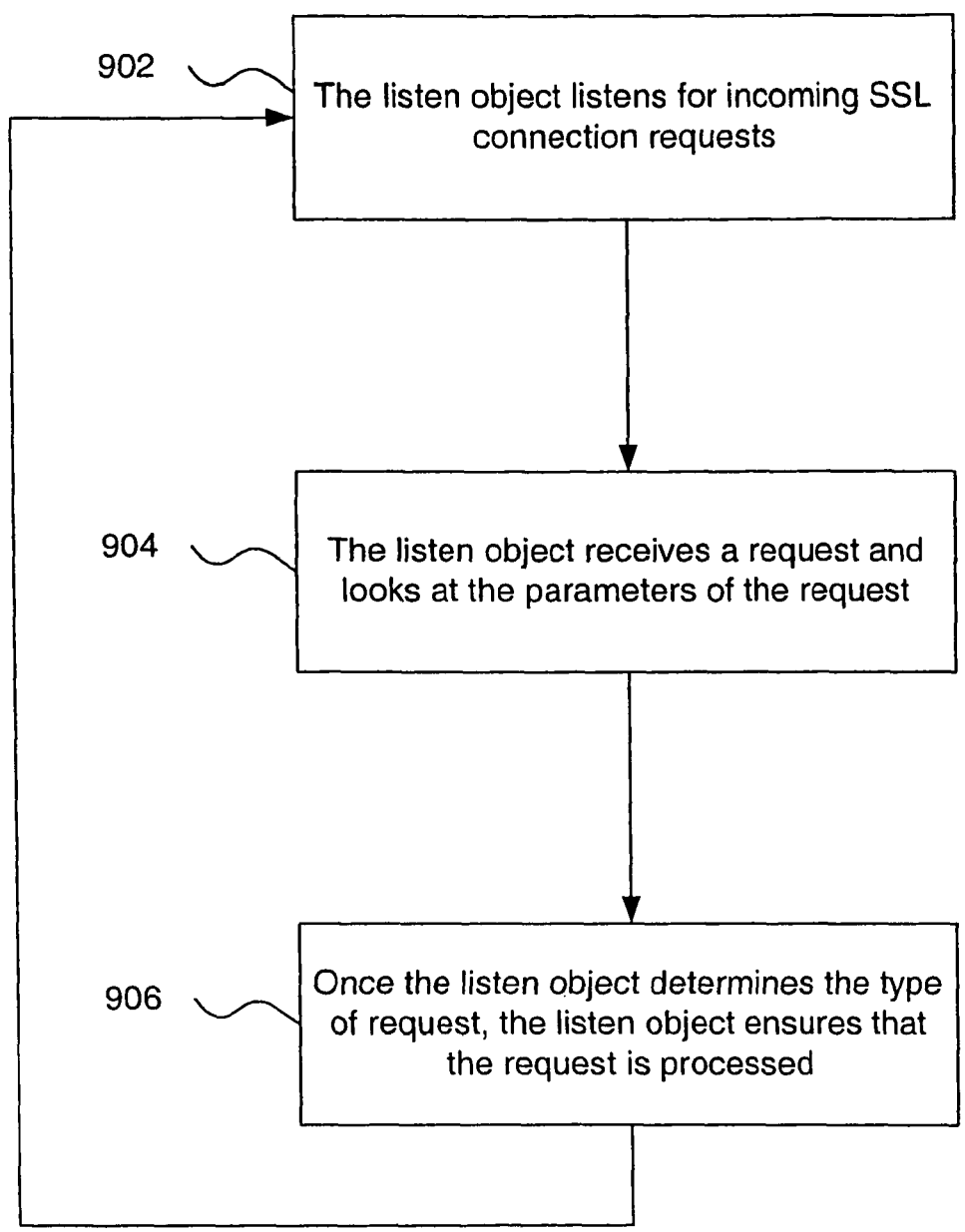
FIG. 9 illustrates tasks of the listen object of the remote enrollment function according to an embodiment of the present invention.

As explained above, the listen object is instantiated by authentication server 202 at the time authentication server 202 starts up. The listen object is responsible for the following tasks as illustrated by FIG. 9. In FIG. 9 the flowchart starts at step 902. Once instantiated, the listen object acts like a HTTP daemon listening on the standard SSL port (i.e., port 443) for incoming SSL connection requests, as illustrated by step 902. Control then passes to step 904.

In step 904, once the listen object receives a SSL connection request, the listen object looks at the parameters of the request and determines whether control should be transferred to the enroll object, the comm object, or any other functional object the present invention supports. Note that FIG. 6 illustrates the case where there is only one type of request possible (i.e., an authentication request). Control then passes to step 906.

In step 906, the listen object ensures that the request is processed. Control then passes back to step 902, where the listen object listens for incoming SSL connection requests. The listen object is only destroyed once authentication server 202 is turned off.

b. Communication Components—Comm object

A comm object is instantiated for each new client session. A client session results when a user at web browser 212 attempts to access web/application server 214. Once the enrollment process is completed, an error occurs, or a timeout occurs, the corresponding comm object is destroyed. The comm object is responsible for the same tasks as illustrated by FIG. 7.

c. Enroll Components—Enroll object

Figure 10:
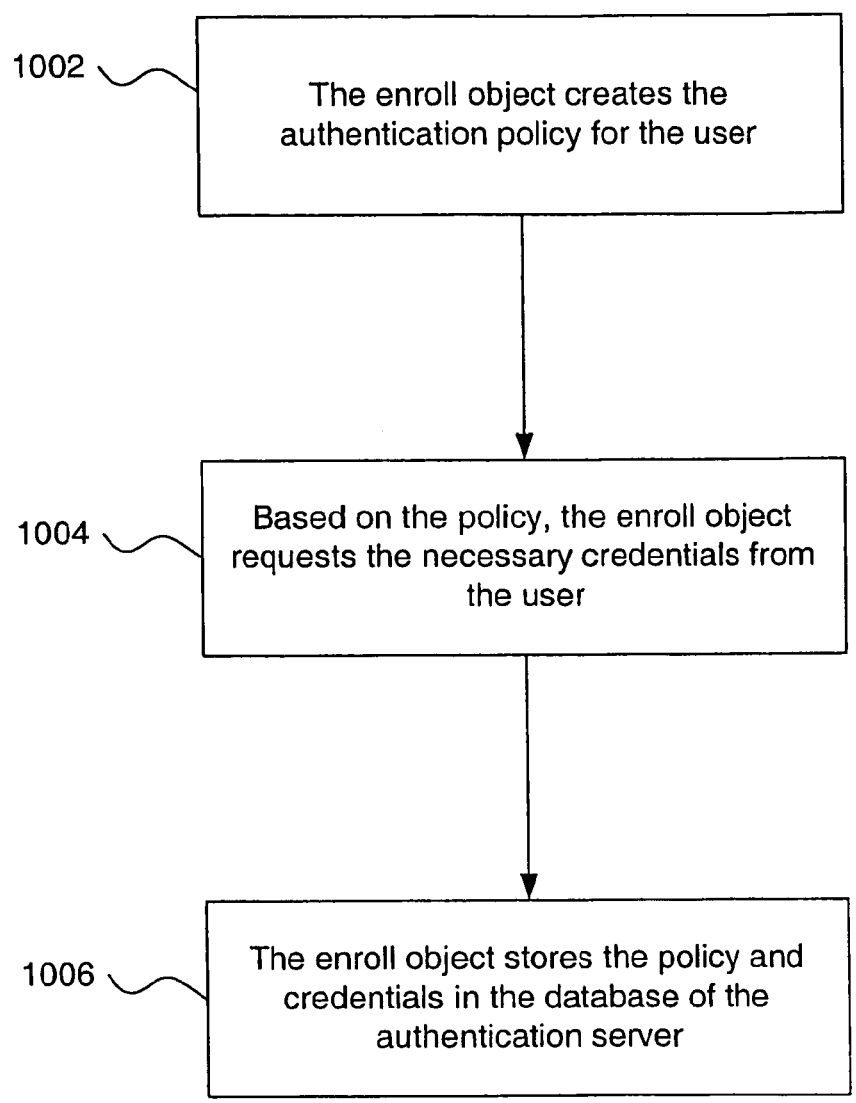
FIG. 10 illustrates tasks of the enroll object of the remote enrollment function according to an embodiment of the present invention.

The enroll object is the counterpart of the authentication object described above, in that it implements the logic for and drives the message exchange with authentication control component 208 (through the enroll application). A new instance of the enroll object is also instantiated for each new client session. As with the communication objects and authentication objects described above, enroll objects may also be communication medium specific. The tasks of the enroll object are illustrated in FIG. 10. In FIG. 10, control starts at step 1002. In step 1002, the enroll object creates the policy (or policy object) for the user. Control then passes to step 1004.

In step 1004, based on the created policy, the enroll object requests the necessary credentials from the user to be stored as a template. For example, if the policy requires that the user be tested on both a fingerprint device and a hand print device, the enroll object requests the biometric measurements of the user's fingerprint and hand-print. Control then passes to step 1006.

In step 1006, the enroll object stores the policy and credentials (or templates) in the database of authentication server 202. The flowchart in FIG. 10 ends at this point.

Although an embodiment of the present invention includes all of the functional components of the present invention discussed above, several (or all) components may be combined as long as the functionality of each component still exists within the present invention as described above.

5. User Management Components

The present invention allows a user to register his or her credentials once with the present invention. The present invention then reuses the user's credentials to authenticate the user to access one or more potentially unrelated online accounts provided by web/application servers 214. The present invention also allows the user to determine which policy and types of identification devices should be used to authenticate the user to a particular user online account provided by web/application server 214.

There are multiple ways in which the user can first be associated with the present invention. One way is for the user to be redirected by web/application server 214 to the present invention. Here, web/application server 214 may either require that the user register with the present invention or simply provide the user with the opportunity to register with the present invention. Another way in which a user can first be associated with the present invention is for the user to directly contact the present invention to determine which web/application servers 214 utilize the present invention. For example, if the user is looking for an online banking application/provider and is concerned with protecting his or her confidential account information, the user may actually choose his or her online banking provider based on whether the online banking provider utilizes the present invention.

The present invention allows users to define the level of protection of access to their online accounts. The present invention then reuses those credentials to authenticate the user to one or more potentially unrelated online accounts. User management component includes user management component 207. It is the function of user management component 207 to maintain a central data center that stores and manages (and thus reuses) user credentials for authentication to potentially unrelated online accounts provided by web/application servers 214.

User management component 207 drives the presentation logic of the user management process. User management component 207 may drive the interaction with the user through authentication control component 208 by presenting wizards and/or the user visible HTML pages that are viewed in web browser 212 to capture the policy(ies) (which includes the necessary identification devices to execute the policy(ies)) specified by the user and user credentials (e.g., biometric measurement, password, etc.). On the back-end, user management component 207 interacts with authentication server 202 to provide the policy that should be used when attempting to authenticate the user to a particular online account. User management component 207 may be developed using any of the industry standard platforms including, but not limited to, Java Servlets, Enterprise Java Beans, ISAPI extensions, Active Server Page programs, and so forth.

Figure 15:
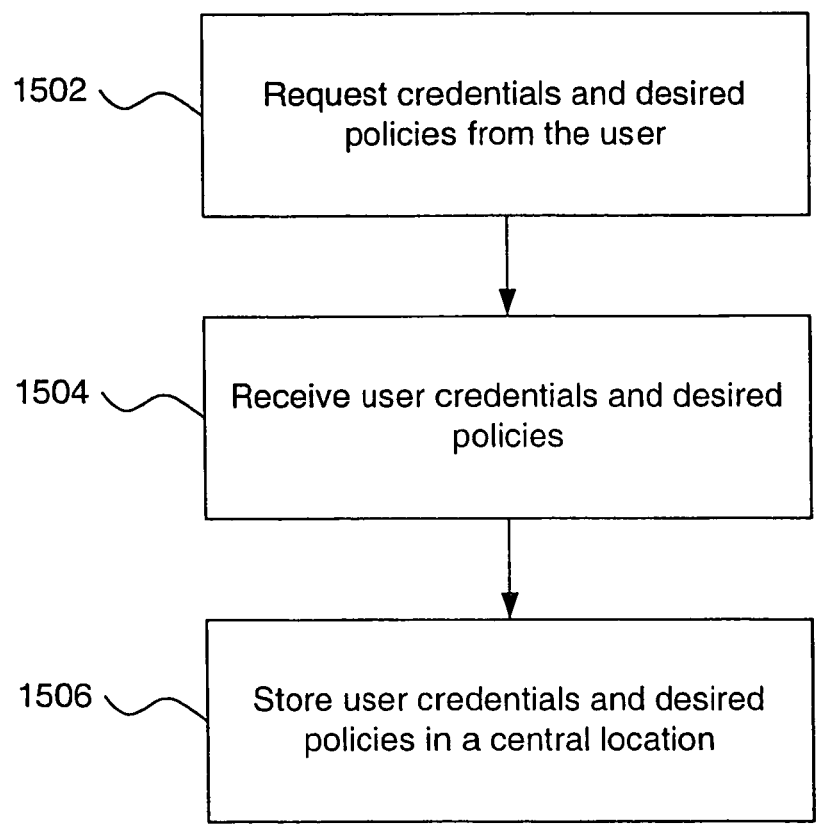
FIG. 15 is a high level flowchart illustrating the present invention requesting and then storing user credentials and requested policies in order to allow the user to define the level of protection of access to one or more of the user's online application accounts according to an embodiment of the present invention.

FIG. 15 is a high level flowchart illustrating the present invention requesting and then storing user credentials and requested policies in order to allow the user to define the level of protection of access to one or more of the user's online accounts. In step 1502, the present invention requests that the user indicate which policy to use for a particular online account provided by web/application server 214. This may also include allowing the user to determine the identification devices used to implement the user-determined policy. As will be described further below, the user may indicate the same policy for all of the user's online accounts, or use different policies for each account. The user's online accounts may be provided by the same web/application server 214 or different web/application servers 214. Based on the indicated policy(ies), the present invention guides the user to supply credentials (e.g., biometric measurement, password, etc.) needed to execute the policies. The storage and management of user credentials for providing to end-users unified authentication services for online or web applications is decoupled from the authentication and enrollment functions of the present invention. In fact, it is authentication control component 208 that captures the user's desired policy and, then based on the desired policy, captures the required credentials. Control then passes to step 1504.

In step 1504, user management component 207 receives the user's desired polices for each of the user's online accounts and user credentials from authentication control component 208. Control then passes to step 1506.

In step 1506, user management component 207 stores the received user credentials and desired polices in a central location. The database of authentication server 202 may act as the central location or data center for the user management function of the present invention. As will be described below in detail, there are many different ways in which this information may be organized to facilitate the present invention. The flowchart in FIG. 15 ends at this point.

How the present invention may organize data in a central data center so as to tie a single user to multiple unrelated web applications is described next. The present invention assigns an ID to each user that uniquely identifies the user. In an embodiment of the present invention, this ID is a Globally Unique ID (or GUID) which uniquely identifies the user to the present invention. For example, assume a user "John Smith" has an account with several different web applications including tradeonline.com for his day trading, drugonline.com for filling his medical prescriptions, and bankonline.com for his banking needs. It is important to note that each of these web applications may potentially not know the other applications exists. (One thing they have in common is that they have all agreed to work with the present invention to allow users to define the level of protection that is allotted to the user's account.) Therefore, each of the web applications have provided John Smith with unique usernames. For example, assume that tradeonline.com has provided John Smith with the username of "jsmith.user.tradeonline.com"; drugonline.com has provided John Smith with the username of "johnsmith.customer.drugonline.com"; and bankonline.com has provided the username of . . . john1234.account.bankonline.com." The present invention must map each of the unrelated usernames to John Smith's GUID. For illustration purposes, assume that John Smith's GUID is "1234-5678-9101." There are many ways in which this can be done. One way is represented by the following Table 1:

TABLE 1

| Online Username | GUID |
|---|---|
| j smith. user. tradeonline. com | 1234-5678-9101 |
| j ohnsmith. customer. drugonline. com | 1234-5678-9101 |
| john1234.account.bankontine.com | 1234-5678-9101 |
| • | : |

As Table 1 illustrates, the present invention maps each of John Smith's account usernames to the same GUID. The following Table 2 can then be used to map John Smith's GUID to the policy that should be used to authenticate the user. (Assume that John Smith has decided to use the same policy for each of his accounts.

TABLE 2

| GUID | [0100]Policy ID |
|---|---|
| 1234-5678-9101 | 0x2786 |
| 1289-2828-2923 | 0x2393 |
| • | • |

In another embodiment of the present invention, the user is made aware of his or her GUID. The advantage to this is that the user can enter his or her GUID instead of his or her username for an account with a web/application server 214. Of course this would require some intelligence in the web/application server 214 to recognize the GUID. The benefit to this is that Table 1 can be eliminated. The present invention can go directly to Table 2 to determine the policy for the GUID.

In another embodiment of the present invention, John Smith wants to use different policies for each of his accounts. Table 3 illustrates how this is done by the present invention. Here, a table similar to Table 2 above can be eliminated.

TABLE 3

| Online Username | GUID | Policy ID |
|---|---|---|
| ismith user.tradeonline.corn | 1234-5678-9101 | 0x2786 |
| johnsmith.customer.drugonline.com | 1234-5678-9101 | 0x2393 |
| john 1234.account.bankonline.com | 1234-5678-9101 | 0x3456 |
| : | • | • |

The policy ID in Table 2 and Table 3 represents a policy already defined by the present invention and stored in the database of authentication server 202. As mentioned above, the user may indicate the same policy for all of the user's online accounts, or use different policies for each online account. Thus, the GUID may have a 1:1 or an m:n relationship with a user policy. Specific examples of pre-defined policies provided by the present invention include an OR policy, an AND policy, a CONTINGENT policy, a RANDOM policy, a THRESHOLD policy, a multi-user policy, a multi-location policy, a multi-template policy, a user dependent policy, a location restriction policy, and a computer/device specific policy. The present invention also allows the administrator to define or configure other policies. These pre-defined policies and how the administrator defines or configures other policies are explained in detail in related, co-pending U.S. application Ser. No. 09/264,726 and U.S. application Ser. No. 09/517,121. The tasks of user management component 207 are described next with reference to FIG. 13.

Figure 13:
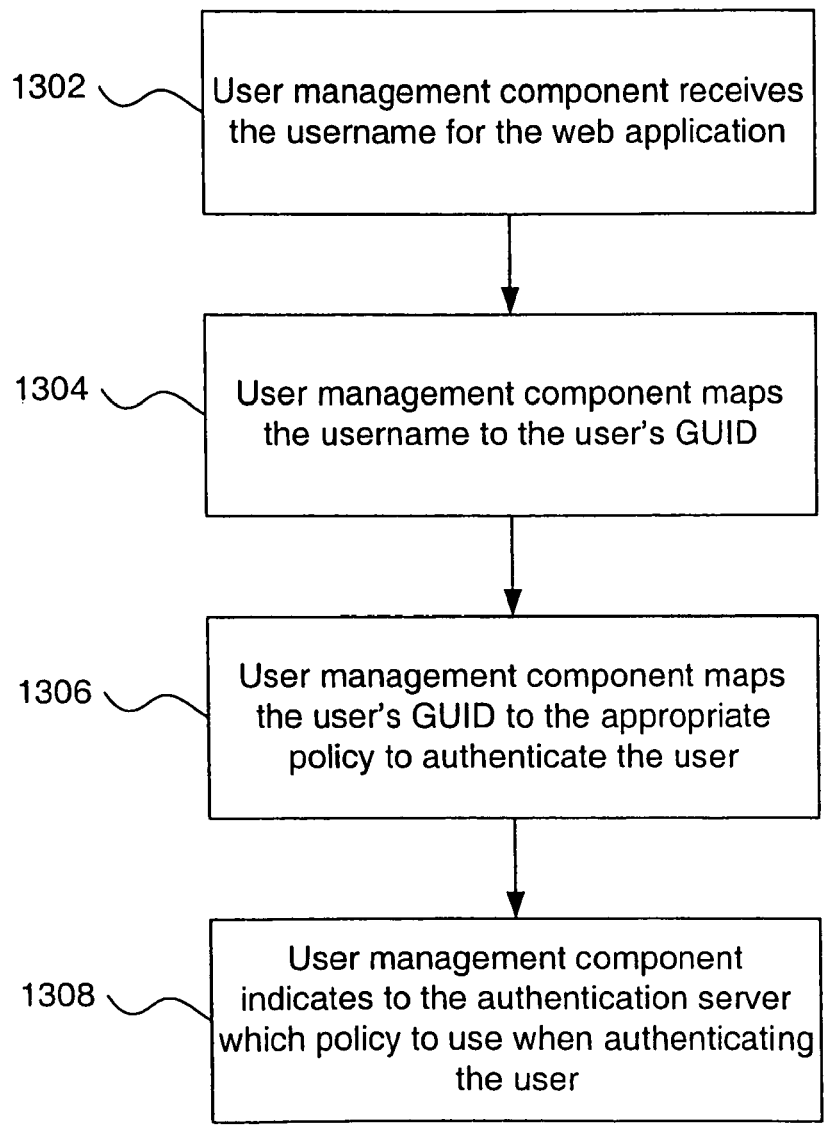
FIG. 13 illustrates tasks of the user management component according to an embodiment of the present invention.

In FIG. 13, control starts at step 1302. In step 1302, the user management component 207 receives the username for the web application or online account the user is attempting to access. Again, this username is unique to the user with regard to the particular web application. Control then passes to step 1304.

In step 1304, the user management component 207 maps the username to the user's GUID of the present invention. Again, this may be done by utilizing a table such as Table 1 above. Control then passes to step 1306.

In step 1306, the user management component 207 maps the user's GUID to the user's policy (or policy object) of the present invention. This may be done utilizing a table such as Table 2 above. Control then passes to step 1308.

In step 1308, the user management component 207 indicates to authentication server 202 which policy to use when attempting to authenticate the user to the online account or web application. The flowchart in FIG. 13 ends at this point.

Although an embodiment of the present invention includes all of the functional components of the present invention discussed above, several (or all) components may be combined and not depart from the scope of the present invention.

C. An Example Implementation of the Present Invention

1. An Example Environment

Figure 3:
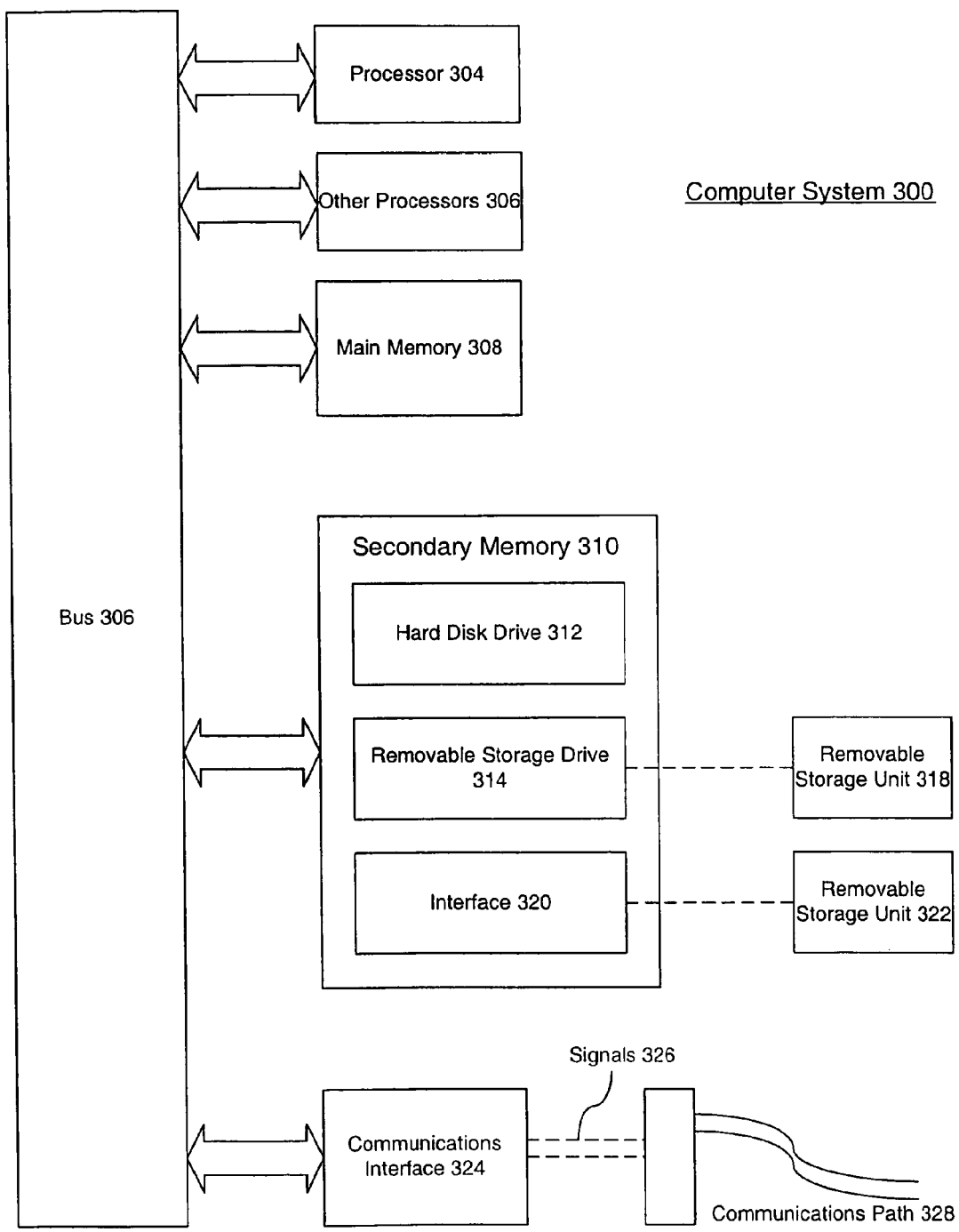
FIG. 3 illustrates an example computer that may be used to implement components of the present invention according to an embodiment.

Authentication server 202, communication components 204, filter 206, user management component 207, authentication control component 208, enrollment station, administration station and satellite enrollment station could be implemented using computer 300 as shown in FIG. 3. Obviously, more than one of these functional components could be implemented on a single computer 300.

The present invention may be implemented using hardware, software or a combination thereof and may be implemented in a computer system or other processing system. In fact, in one embodiment, the invention is directed toward one or more computer systems capable of carrying out the functionality described herein. The computer system 300 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318, represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such can include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 318 to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCMCIA slot and card, etc. Software and data transferred via communications interface 324 are in the form of signals which can be electronic, electromagnetic, optical or other signals capable of being received by communications interface 324. These signals 326 are provided to communications interface via a channel 328. This channel 328 carries signals 326 and can be implemented using wire or cable, fiber optics, a phone line, a cellular phone link, an RF link and other communications channels.

In this document, the terms "computer program medium" and "computer usable medium" are used to generally refer to media such as removable storage device 318, a hard disk installed in hard disk drive 312, and signals 326. These computer program products are means for providing software to computer system 300.

Computer programs (also called computer control logic) are stored in main memory and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

2. An Example Network Architecture and Programming Language

As discussed above, computer programs when executed, enable computer 302 to perform the functions of the present invention as discussed herein. In an embodiment, the present invention is implemented using computer programs written in an object-oriented programming language. Object-oriented programming is a type of programming in which programmers define not only the data type of a data structure, but also the types of operations (functions) that can be applied to the data structure. In this way, the data structure becomes an object that includes both data and functions. In addition, programmers can create relationships between one object and another. For example, objects can inherit characteristics from other objects.

One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify. To perform object-oriented programming, one needs an object-oriented programming language (OOPL). C++ and Smalltalk are two of the more popular languages, and there are also object-oriented versions of Pascal.

While an embodiment of the present invention is implemented using computer programs written in an object-oriented programming language, the present invention can also be implemented using procedural programming languages, etc.

As discussed above, one or more of computers 302 is connected by a network. An embodiment of the present invention uses a type of network architecture called a peer-to-peer object architecture. Before peer-to-peer object architecture can be understood, a type of network architecture called client/server architecture must be described. Client/server architecture is a network architecture in which each computer or process on the network is either a client or a server. Servers are computers or processes dedicated to managing disk drives (file servers), printers (print servers), applications/functions or network traffic (network servers). In fact, a server is any computer or device that allocates resources for an application. Clients are personal computers or workstations on which users run applications. Clients rely on servers for resources, such as files, devices, execution of functions and even processing power.

As stated above, an embodiment of the present invention uses a type of network architecture called a peer-to-peer object architecture. A peer-to-peer object architecture is when each computer in the network has equivalent capabilities and responsibilities. This differs from client/server architectures, in which some computers are dedicated to serving the others. Therefore, in an embodiment of the present invention, all computers 302 can operate as either a server or a client. The engine and data stored in authentication server 202 is described next.

D. Engine and Data of the Present Invention

As stated above, authentication server 202 of FIG. 2 is the engine of the present invention. In an embodiment of the present invention, it is this engine (executing a policy) that ultimately determines whether or not a user is authenticated by the present invention. In addition, authentication server 202 stores data accessed by the present invention. The ways in which the data stored in authentication server 202 can be configured include as a database and as a directory. Both the database and directory configurations are described in detail in related, co-pending U.S. application Ser. No. 09/264,726 and U.S. application Ser. No. 09/517,121.

The various collections of data stored in authentication server 202, along with a typical sequence of steps an administrator may take to initially setup authentication server 202, are also described in detail in related, co-pending U.S. application Ser. No. 09/264,726 and U.S. application Ser. No. 09/517,121. Typical data stored in authentication server 202 include, but are not limited to, templates, policies (or policy IDs), groups, device IDs, user IDs, computer IDs and application IDs. Additional data may include one or more tables that map the user's unique username for a web application to the user's GUID, and then to the user-specified policy.

One or more unique templates is created and stored in authentication server 202 each time a user enrolls on a different identification device. A template stores the user's unique measurement for a particular biometric device (which is then used to match against the user's "live" measurement when the device is attempting to identify the user) or password, etc., for a non-biometric device.

Policies of the present invention determine the method or way in which a user is to be authenticated by authentication server 202. Specific examples of pre-defined policies provided by the present invention include an OR policy, an AND policy, a CONTINGENT policy, a RANDOM policy, a THRESHOLD policy, a multi-user policy, a multi-location policy, a multi-template policy, a user dependent policy, a location restriction policy, and a computer/device specific policy. The present invention also allows the administrator to define or configure other policies.

Each pre-defined policy has a list of devices associated with it. The list of devices identifies the identification devices that are used to execute the particular policy. Each device in the list of devices may have a threshold value and a timeout value associated with it (this is typically true with biometric devices). The threshold value (e.g., false acceptance rate) indicates the level of identification the device must determine for the user to pass the device. The timeout value indicates the time in which the device has to identify the user to the level of identification indicated by the threshold value.

Groups in the present invention are a logical way of combining one or more users that need access to the same set of information stored on web/application server 214. For example, all users in the Internet may be allowed to access the login page of an online application that allows users to trade stocks. For the same online application, the user and only other users specified by the user would be in the group that is allowed to access confidential information of the user. Therefore, one of the groups can be defined as "USR24458 group." Here, when a user is put into "USR24458 group," that user (once authenticated by the present invention) has access to the same resources as all the other users in "USR24458 group."

Each user can be put into one or more groups. When the user attempts to gain access to information in a particular group, the user must be authenticated by whichever policy is associated with that particular group.

A device ID identifies an identification device. Each identification device has a unique ID. Thus, the collection of device IDs allows the present invention to uniquely identify each identification device attached to Communication protocol-enabled clients (web browsers) in the Internet. Similarly, a user ID uniquely identifies a user utilizing the present invention. The message flows between the components of the present invention to authenticate the user and to remotely enroll the user are described next in Section E and Section F, respectively.

Figure 11:
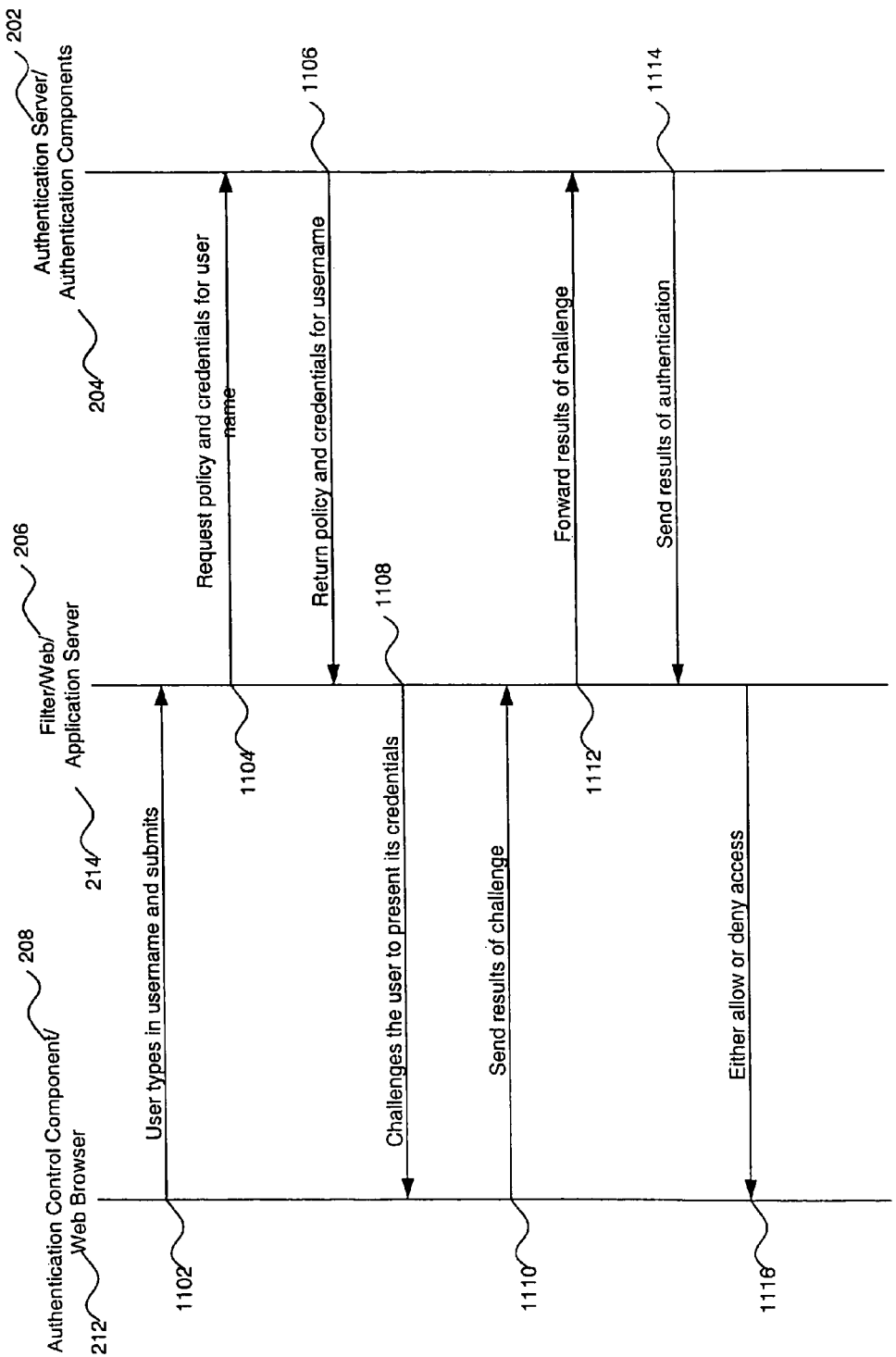
FIG. 11 illustrates a high level message flow between the components of the present invention for authenticating a user using a web browser according to an embodiment of the present invention.

E. Message Flow Between Components for Authentication by the Present Invention FIG. 11 illustrates a high level message flow between the components of the present invention for authenticating a user using web browser 212 according to an embodiment of the present invention. When the user tries to access a web site or a web application that is using the services of the present invention, the user is prompted to enter the "username" that the user registered with during the enrollment process. This "username" is sent to filter 206, as shown by flow line 1102.

Once filter 206 receives the "username," filter 206 then sends a request to authentication server 202 (via communication components 204) to retrieve the "username" policy and templates (or credentials) stored in its database, as shown by flow line 1104.

Authentication server 202 retrieves the "username" policy and templates and returns them to filter 206 (via communication components 204), as shown by flow line 1106.

Based on the policy and templates, filter 206 challenges the user to present the user's credentials, as shown by flow line 1108. Here, authentication control component 208 guides the user through any necessary biometric measurement capture and matching processes.

Authentication control component 208 then sends the results of the challenge to filter 206 who forwards those results to authentication server 202 (via communication components 204), as shown by flow lines 1110 and 1112, respectively.

Based on the user policy, authentication server 202 then decides whether the match was good enough and if additional credentials are required (as in the case of multi factored authentications or policies) to access the particular information requested by the user. If multi factored authentication is required, then flow lines 1106 through 1112 are repeated as many times as necessary.

Once authentication server is able to execute the user's policy and determines whether the user has been authenticated, communication components 204 forwards the result to filter 206, as shown by flow line 1114. Here, if the user has been authenticated, then filter 206 interacts with web/application server 214 to allow the user access to its requested information.

The user can use the web application or web site for the duration of that session (i.e., until the user closes web browser 212). Thus, filter 206 either allows or denies the user access to the requested information, as shown by flow line 1116. The message flow between components for remote enrollment of the present invention will be described next.

Figure 12:
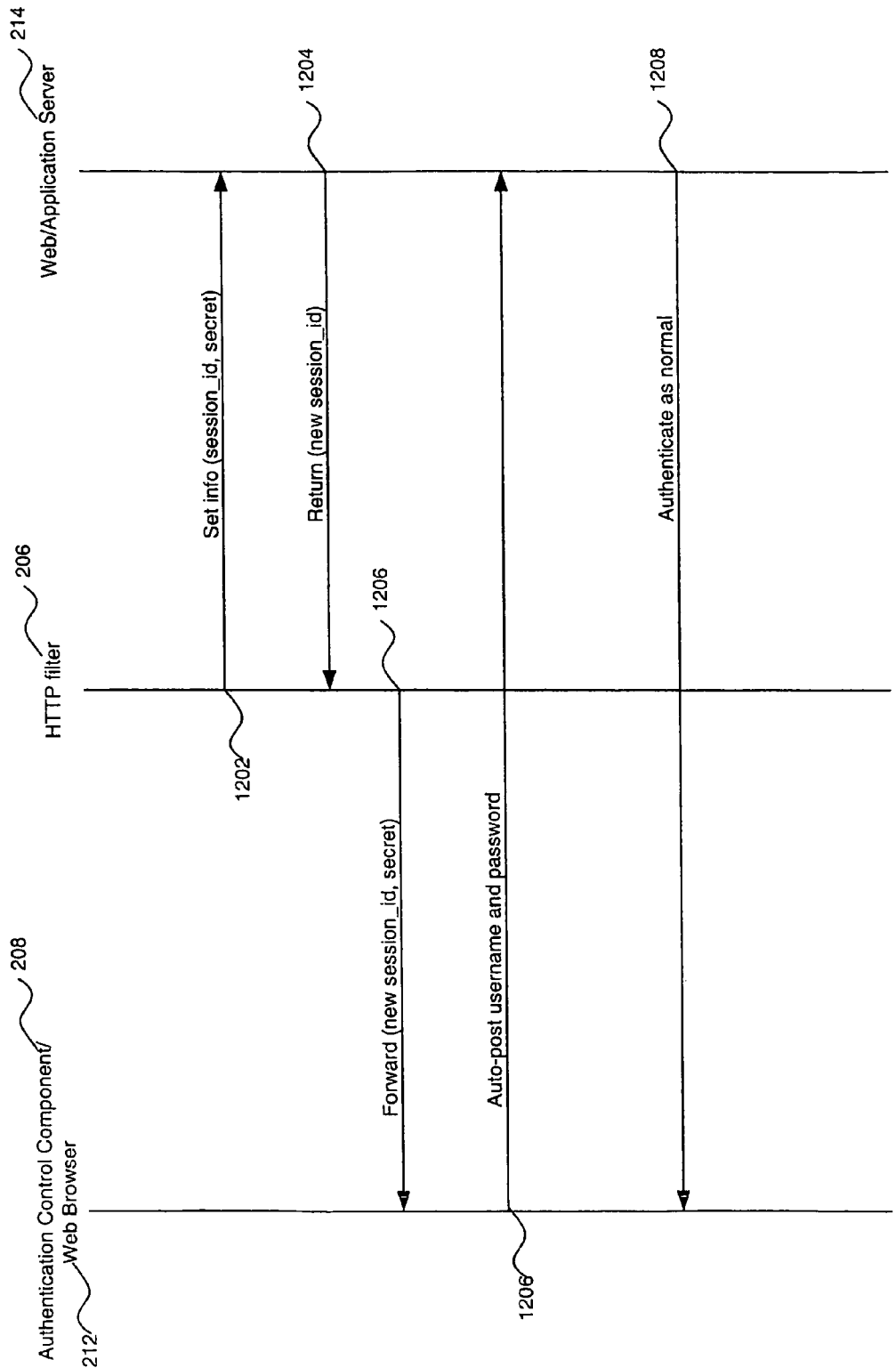
FIG. 12 illustrates a high level message flow between the components of the present invention for remotely enrolling a user using web browser 212 according to an embodiment of the present invention.

F. Message Flow Between Components for Remote Enrollment by the Present Invention FIG. 12 illustrates a high level message flow between the components of the present invention for remotely enrolling a user using web browser 212 according to an embodiment of the present invention. The message flow for remote enrollment is very similar to the message flow for authentication. The enroll application manages the interaction with the user. For authenticating the user to use the enroll application itself, several techniques may be used by the present invention. For example, the existing username-password combination that a user uses to access the application or web site today may be used. Another example is a one-time password or PIN may be generated and mailed (electronically or otherwise) to the user. In either case, the enroll object (described above with reference to FIG. 10) performs the one-time authentication of the user before proceeding to download authentication control component 208 on the user's computer.

Referring to FIG. 12, the user submits the one-time password or PIN to filter 206, as shown in flow line 1202.

Filter 206 then requests one-time authentication for the user by the enroll object, as shown by flow line 1204.

The result of the one-time authentication is returned to filter 206, as shown by flow line 1206.

Filter 206 forwards this request to authentication control component 208, as shown by flow line 1208.

Authentication control component 208 (via the enroll application) captures the necessary biometric measurements from the user and then posts the results of this capture to filter 206, as shown by flow line 1210.

The results of this capture are then forwarded from filter 206 to the enroll object to store the results in authentication server 202, as shown by flow line 1212.

The user at this point has been enrolled in the present invention. The component API and extensibility of the present invention are described next.

Figure 14:
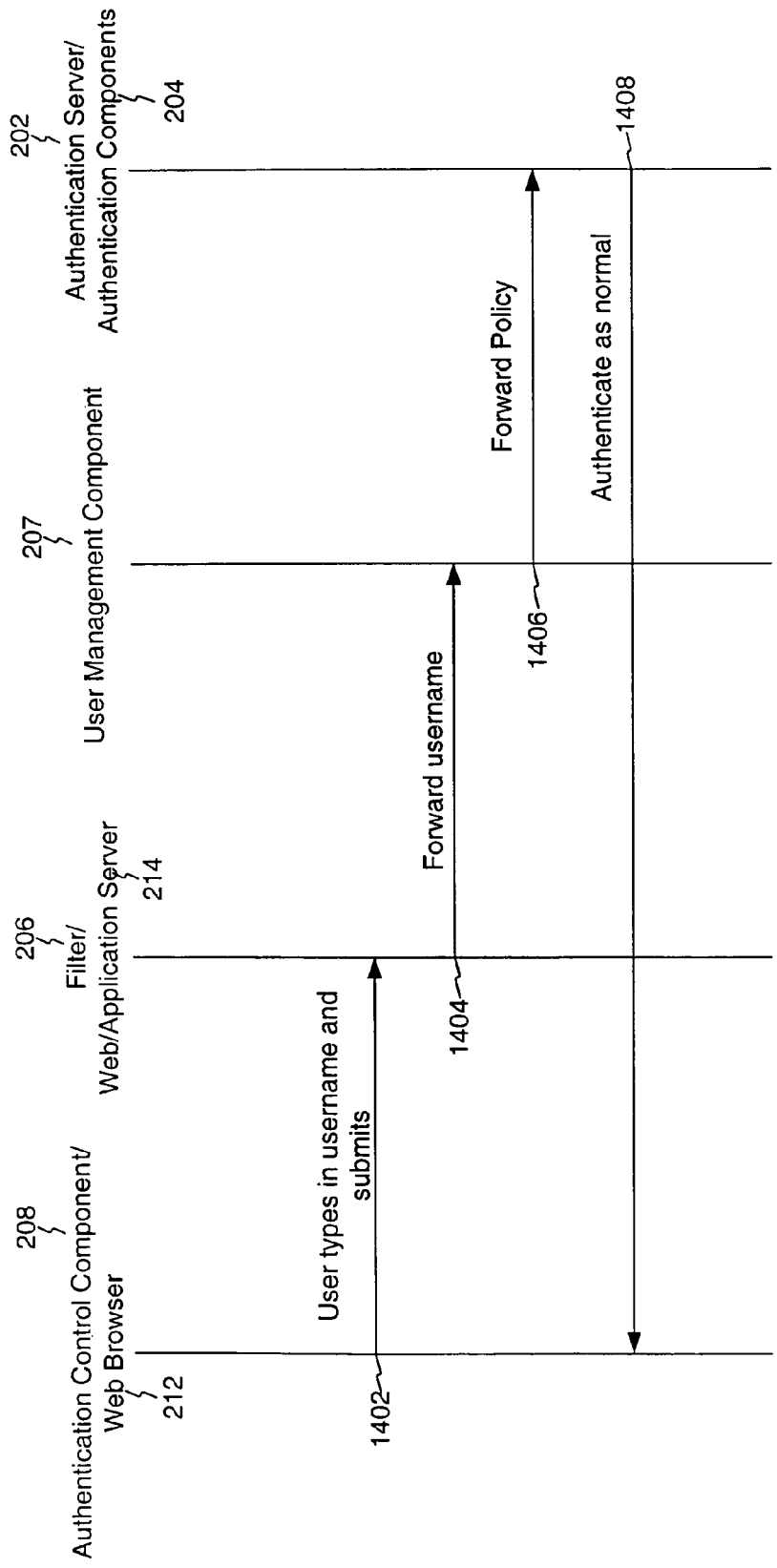
FIG. 14 illustrates a high level message flow between the components of the present invention for user management using a web browser according to an embodiment of the present invention.

G. Message Flow Between Components for User Management by the Present Invention FIG. 14 illustrates a high level message flow between the components of the present invention to provide unified authentication services to a user using web browser 212 according to an embodiment of the present invention. When the user tries to access an account provided by web/application server 214 that is using the services of the present invention, the user is prompted to enter the "username" that they registered with for that account (for example, "jsmith.user.tradeonline.com"). This "username" is sent to filter 206, as shown by flow line 1402.

Once filter 206 receives the "username," filter 206 then forwards the "username" to user management component 207, as shown by flow line 1404. Here, user management component 207 determines the GUID and policy (which includes any necessary identification devices needed to execute the policy) to use to authenticate the user.

User management component 207 then forwards the policy to authentication server 202, as shown by flow line 1406.

Authentication server 202 then authenticates as normal utilizing the policy provided to it by user management component 207, as shown by flow line 1408.

H. Component API and Extensibility of the Present Invention

The server side components (i.e., authentication server 202 and communication components 204), filter 206 and enroll application present a well-defined interface to web-enabled clients. These interfaces consist of a set of URLs that can be requested using HTTP GET or POST methods. The API and related conventions shown below are only examples of how to implement these interactions. These examples are not meant to limit the present invention. All URL requests could be required to follow the syntax below:

| | |
|---|---|
| METHOD | Type of HTTP method. Can be GET or POST |
| HEADER | HTTP header. Format is name=value |
| BODY | Body of the HTTP request. Can be a series of name=value pairs, binary data, or both |
| <foobar> | Denotes an optional element. |
| foo I bar | Denotes "foo" OR "bar" |

The server-side components, filter 206 and the enroll application expect requests in a specific format. The responses to these requests also follow a specific format. This allows for an extensible architecture and enables the plugging in of new web-enabled services to the existing infrastructure. BNF is an acronym for "Backus-Naur Form," which is a metasyntactic notation used to specify the syntax of programming languages, command sets, and the like. Following is a BNF of a request of the present invention that includes an identification of the type of object that needs to be created and the data to send to the object.

```
<request> ::= <function>   <function> I <request><connector><request> <identifier>
::= <parameter> ::=        ({<parameter>}) <identifier> I <identifier> <letter> {<letter> I
<identifier> ::= <letter>  <digit>}
::=                        AIBICIDIEIFIGIHIIIJIKILIMI N I
                           ° IPIQIRISITIUIVIWIXIYIZ
<digit> ::=                0 1 1 1 2 1 3 1 4 1 5 1 6 1 7 1 8 1 9
<connector> ::= AND'
OR
```

Using the same method described here, albeit a different set of URLS, the architecture can easily be extended to allow other web functionality to be added to authentication server 202. Such an example of another functionality includes remote administration of authentication server 202.

I. Conclusion

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A computer-implemented method comprising:
   assigning, by a user management server, a globally unique ID (GUID) for a user;
   receiving, by the user management server, a first username for a first website associated with a first account of the user and a second username for a second website associated with a second account of the user;

associating, by the user management server, the first username and the second username with the GUID;

establishing, by the user management server, a first policy component of an authentication server for access to the first account, wherein the first policy component requires a first type of credential for access;

establishing, by the user management server, a second policy component of an authentication server for access to the second account, wherein the second policy component requires a second type of credential for access;

capturing, by the user management server, the first type of credential and the second type of credential;

storing, by the user management component, the first type of credential as the first policy component with the GUID in a database;

storing, by the user management component, the second type of credential as the second policy component with the GUID in the database;

providing, by the user management component, access to the first account of the user when receiving input of the GUID and the first type of credential; and providing, by the user management server, access to the second account of the user when receiving input of the GUID and second type of credential, wherein the first type of credential comprises a first level of protection and the second type of credential requires a second level of protection, the second level of protection requiring the first type of credential and the second type of credential; and wherein the first level of protection is defined by the first policy component and the second level or protection is defined by the second policy component.

2. The method of claim 1, wherein the first type of credential comprises information from a first identification device and the second type of credential comprises information from a second identification device.

3. The method of claim 2, wherein the first identification device comprises biometric measurement.

4. The method of claim 2, wherein the first identification device and the second identification device measure credential information differently.

5. The method of claim 1, further comprising:
receiving, by the user management server, a third username for a third website associated with a third account of the user; and
associating, by the user management server, the third username with the GUID.

6. The method of claim 5, further comprising:
establishing, by the user management server, a third policy component for access to the third account, wherein the third policy component requires a third type of credential for access.

7. The method of claim 6, further comprising:
capturing, by the user management server, the third type of credential; and
storing, by the user management server, the third type of credential as the third policy component with the GUID in the database.

8. The method of claim 7, further comprising:
providing, by the user management server, access to the third account of the user when receiving input of the GUID and the third type of credential.

9. The method of claim 8, wherein the third type of credential comprises a third level of protection, the third level of protection requiring the first type of credential, the second type of credential, and the third type of credential.

10. The method of claim 8, wherein the third type of credential comprises a third level of protection, the third level of protection requiring the first type of credential and the third type of credential.

11. A system comprising:
a user management processor configured to execute instructions stored on a non-transitory computer-readable medium, the instructions configured to:
assign a globally unique ID (GUID) for a user;
receive a first username for a first website associated with a first account of the user and a second username for a second website associated with a second account of the user;
associate the first username and the second username with the GUID;
establish a first policy component for access to the first account, wherein the first policy component requires a first type of credential for access;
establish a second policy component for access to the second account, wherein the second policy component requires a second type of credential for access;
capture the first type of credential and the second type of credential;
store the first type of credential as the first policy component with the GUID in a database;
store the second type of credential as the second policy component with the GUID in the database;
provide access to the first account of the user when receiving input of the GUID and the first type of credential; and
provide access to the second account of the user when receiving input of the GUID and second type of credential,
wherein the first type of credential comprises a first level of protection and the second type of credential requires a second level of protection, the second level of protection requiring the first type of credential and the second type of credential; and
wherein the first level of protection is defined by the first policy component and the second level or protection is defined by the second policy component.

12. The system of claim 11, wherein the first type of credential comprises information from a first identification device and the second type of credential comprises information from a second identification device.

13. The system of claim 12, wherein the first identification device comprises biometric measurement.

14. The system of claim 13, wherein the first identification device and the second identification device measure credential information differently.

15. The system of claim 11, wherein the user management processor is further configured to:
receive a third username for a third website associated with a third account of the user; and
associate the third username with the GUID.

16. The system of claim 15, wherein the user management processor is further configured to:
establish a third policy component for access to the third account, wherein the third policy component requires a third type of credential for access.

17. The system of claim 16, wherein the user management processor is further configured to:
capture the third type of credential; and
store the third type of credential as the third policy component with the GUID in the database.

18. The system of claim 17, wherein the user management processor is further configured to:
provide access to the third account of the user when receiving input of the GUID and the third type of credential.

19. The system of claim 18, wherein the third type of credential comprises a third level of protection, the third level of protection requiring the first type of credential, the second type of credential, and the third type of credential.

20. The system of claim 18, wherein the third type of credential comprises a third level of protection, the third level of protection requiring the first type of credential and the third type of credential.

* * * * *